United States Patent
Kobayashi et al.

(10) Patent No.: US 7,462,672 B2
(45) Date of Patent: Dec. 9, 2008

(54) POLYMER ALLOY

(75) Inventors: Sadayuki Kobayashi, Nagoya (JP); Jiro Kumaki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 11/802,762

(22) Filed: May 24, 2007

(65) Prior Publication Data

US 2007/0225450 A1  Sep. 27, 2007

Related U.S. Application Data

(60) Division of application No. 10/766,487, filed on Jan. 29, 2004, now Pat. No. 7,235,612, which is a continuation-in-part of application No. 10/732,803, filed on Dec. 11, 2003, now abandoned.

(30) Foreign Application Priority Data

Jan. 31, 2003 (JP) ............... 2003-25314
Jan. 31, 2003 (JP) ............... 2003-25317

(51) Int. Cl.
C08L 67/02 (2006.01)
C08L 81/04 (2006.01)

(52) U.S. Cl. ..................................... 525/437

(58) Field of Classification Search .............. None
See application file for complete search history.

(56) References Cited

U.S. PATENT DOCUMENTS

| 4,125,572 A | 11/1978 | Scott ............... 524/449 |
| 5,049,619 A | 9/1991 | Kyu ............... 525/148 |
| 5,106,906 A | 4/1992 | Meier et al. ............... 525/51 |
| 5,108,806 A | 4/1992 | Nedzu et al. ............... 428/35.2 |
| 5,262,473 A | 11/1993 | Cottis et al. ............... 524/537 |
| 2004/0210009 A1 | 10/2004 | Kobayashi et al. ............... 525/433 |
| 2005/0256275 A1 | 11/2005 | Kobayashi et al. ............... 525/349 |

FOREIGN PATENT DOCUMENTS

| DE | 3803663 | 8/1989 |
| EP | 0 104 543 A1 | 4/1984 |
| EP | 0 699 784 A2 | 3/1996 |
| JP | 59-58052 A | 4/1984 |
| JP | 5-156141 A | 6/1993 |
| JP | 8-113829 A | 5/1996 |
| JP | A-2002-069273 A | 3/2002 |

OTHER PUBLICATIONS

Hanley', "Phase Separation in Semicrystalline Blends . . . ", Journal of Polymer Science vol. 38 (2000) pp. 599-610.*

Tattum, "Investigation of Unreacted Polycarbonate-Poly(butylene terephthalate) Melt Blends", *Plastics, Rubber and Composites Processing and Applications*, vol. 25, No. 10; 1996, pp. 477-489.

Okamoto, "Phase Separation Mechanism and Structure Development in Poly(butylene terephthalate)/Polycarbonate Blends", *Polymer*, vol. 35, No. 2; 1994, pp. 257-261.

* cited by examiner

*Primary Examiner*—David Buttner
(74) *Attorney, Agent, or Firm*—Kubovcik & Kubovcik

(57) ABSTRACT

A polymer alloy of polyphenylene sulfide resin and a polyester resin with polyethylene terephthalate as a main component, and forming a co-continuous structure with a wavelength of concentration fluctuation of 0.001 to 1 μm or a dispersed structure with a distance between particles of to 1 μm. The co-continuous structure or dispersed structure of the polymer alloy is formed by the phase separation caused by spinodal decomposition. The polymer alloy is miscible when the shear rate is kept in a range from 100 to 10000 $sec^{-1}$, and is separated into phases under no shear flow. The polymer alloy of this invention can provide a molded article, film, fibers and the like respectively with excellent mechanical properties at high productivity.

3 Claims, 1 Drawing Sheet

POLYMER ALLOY

This application is a division of application Ser. No. 10/766,487 filed Jan. 29, 2004, now U.S. Pat. No. 7,235,612, which is a continuation-in-part of application Ser. No. 10/732,803 filed Dec. 11, 2003, now abandoned, which claims priority of Japanese Patent Application Nos. 2003-25314 and 2003-25317, filed Jan. 31, 2003, each of which is incorporated herein by reference.

BACKGROUND OF THE INVENTION

1. Technical Field

The present invention relates to a method for manufacturing a polymer alloy having a phase-separated structure consisting of at least two components, polymer alloy pellets, a polymer alloy film or sheet, a molded polymer alloy article, a polymer alloy containing polybutylene terephthalate resin and a polycarbonate resin, and a polymer alloy containing polyphenylene sulfide resin and a polyester resin with polyethylene terephthalate as a main component.

2. Background Art

JP5-156141A describes a molded article having a inter penetrating network structure obtained by melt blending polybutylene terephthalate resin, a polycarbonate resin, and acrylic graft (co)polymer particles. It is disclosed that this structure improves chemicals resistance, strength and toughness to some extent compared with a simple polymer alloy. However, according to the method described in the document, satisfactory effects could not be achieved in improving the strength, toughness and heat resistance of the molded article.

JP59-58052A discloses a composition consisting of PPS resin and a thermoplastic polyester resin, and further teaches a method of mixing an epoxy resin for further enhancing miscibility. However, according to the method described in the document, it was difficult to control the dispersion size for making it small. In order to obtain a molded article having excellent strength, toughness and heat resistance, a structure with a smaller dispersion size is desired. Furthermore, if the dispersion size in a polymer alloy is large, there arise such problems that in the case where the polymer alloy is used as fibers, the spinning stability during spinning is poor, and that voids are formed during stretching, to make the fibers fragile. Therefore, a method capable of controlling the structure for making it finer is desired.

JP8-113829A describes polymer blend fibers having a dispersed structure with a dispersion size of 0.001 to 0.4 µm formed in the cross section of each fiber, by melt-spinning a blend of polymers miscible with each other on the molecular level in a specific temperature range, in its miscible state, into fibers, and, for example, heat-treating the fibers for causing spinodal decomposition or nucleation and growth, to thereby cause phase decomposition. However, according to the method described in the document, because of the mechanism, in which the fibers obtained by spinning a polymer blend in its miscible state are heat-treated for causing phase separation, there was a limit in controlling the structure for making it finely dispersed. Furthermore, there was a limit in applicable combinations of polymers, and the form of the polymer blend was also limited to fibers.

To allow production of a molded article with excellent strength, toughness and heat resistance, a polymer alloy having excellent regularity and a homogeneously dispersed fine structure is demanded. A method for manufacturing it is also demanded. Furthermore, a manufacturing method applicable to combinations of immiscible polymers, hence for more general purposes is also demanded.

The problem to be solved by this invention is to provide a polymer alloy having excellent regularity and excellent mechanical properties, useful as a structural material or a functional material and capable of being controlled to have a structure on the order of nanometers or on the order of micrometers. It is also intended to provide a method for manufacturing the polymer alloy.

GIST OF THE INVENTION

A first version of this invention is a method for manufacturing a polymer alloy, comprising the step of melt blending at least two resins used as components miscible under such shear flow as caused by the shear rate kept in a range from 100 to 10000 $sec^{-1}$ and capable of being separated into phases under no shear flow, for making the resins miscible and subsequently inducing spinodal decomposition to cause phase separation, for forming a co-continuous structure with a wavelength of concentration fluctuation of 0.001 to 1 µm or a dispersed structure with a distance between particles of 0.001 to 1 µm.

A second version of this invention is polymer alloy pellets, comprising at least two resins contained as components immiscible under no shear flow, wherein the said at least two resins contained as components are made miscible.

A third version of this invention is polymer alloy pellets, comprising at least two resins contained as components, wherein the at least two resin phases contained as components form a co-continuous structure with a wavelength of concentration fluctuation of 0.001 to 1 µm or a dispersed structure with a distance between particles of 0.001 to 1 µm.

A fourth version of this invention is a polymer alloy film or sheet, comprising at least two resins contained as components, wherein the at least two resins contained as components form a co-continuous structure with a wavelength of concentration fluctuation of 0.001 to 1 µm or a dispersed structure with a distance between particles of 0.001 to 1 µm.

A fifth version of this invention is a molded polymer alloy article, comprising at least two resins contained as components, wherein the at least two resins contained as components form a co-continuous structure with a wavelength of concentration fluctuation of 0.001 to 1 µm or a dispersed structure with a distance between particles of 0.001 to 1 µm.

A sixth version of this invention is a polymer alloy, comprising polybutylene terephthalate and a polycarbonate, and forming a co-continuous structure with a wavelength of concentration fluctuation of 0.001 to 1 µm or a dispersed structure with a distance between particles of 0.001 to 1 µm.

A seventh version of this invention is a polymer alloy, comprising polyphenylene sulfide resin and a polyester resin with polyethylene terephthalate as a main component, and forming a co-continuous structure with a wavelength of concentration fluctuation of 0.001 to 2 µm or a dispersed structure with a distance between particles of 0.001 to 2 µm.

DESIRABLE MODES FOR CARRYING OUT THE INVENTION

Figure 1:
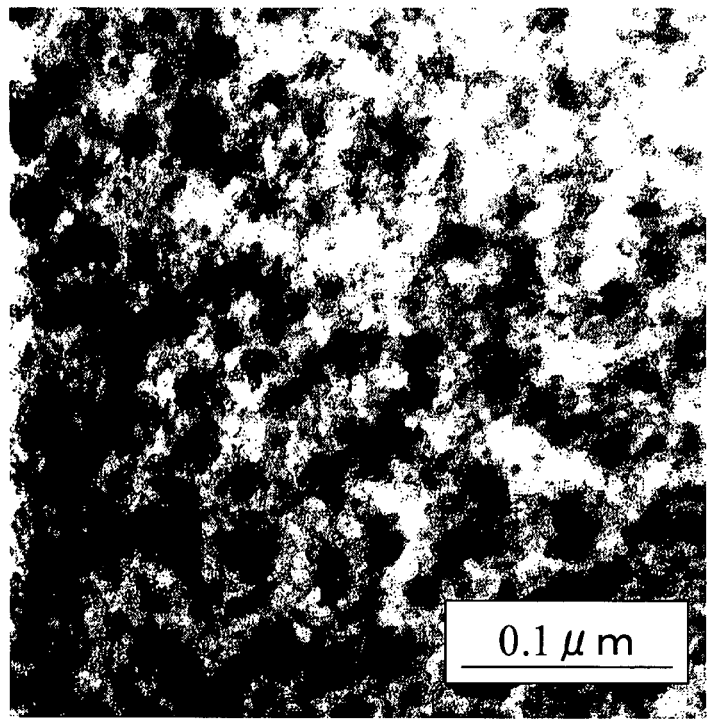
FIG. 1 is a transmission electron microscope photograph showing a structure obtained in the early stage of spinodal decomposition of Working Example 2.

The first version of this invention is a method for manufacturing a polymer alloy, comprising the step of melt blending at least two resins used as components miscible under such shear flow as caused by the shear rate kept in a range from 100 to 10000 $\sec^{-1}$ and capable of being separated into phases under no shear flow, for making the resins miscible and subsequently inducing spinodal decomposition to cause phase separation, for forming a co-continuous structure with a wavelength of concentration fluctuation of 0.001 to 1 µm or a dispersed structure with a distance between particles of 0.001 to 1 µm.

In general, a polymer alloy consisting of two resins contained as components can have a miscible system, immiscible system or partially miscible system. A miscible system refers to a system in which the components are miscible under no shear flow, that is, in an equilibrium state in the entire practical temperature range from the glass transition temperature to the thermal decomposition temperature. An immiscible system refers to a system in which the components are immiscible in the entire temperature range, contrary to the miscible system. A partially miscible system refers to a system in which the components are miscible in a specific range of temperatures and in a specific range of composition ratios but is immiscible in the other ranges. Furthermore, in reference to the condition for causing phase separation, the partially miscible system can be either a system in which spinodal decomposition causes phase separation or a system in which nucleation and growth cause phase separation.

Moreover, in the case of a polymer alloy consisting of three or more components, there can occur a system in which all the three or more components are miscible, a system in which all the three or more components are immiscible, a system in which a miscible mode consisting of two or more components and a mode consisting of the remaining one or more components are immiscible, a system in which two components form a partially miscible mode while the remaining components are distributed in the partially miscible mode consisting of the two components, etc. In this invention, in the case of a polymer alloy consisting of three or more components, a system in which two components form an immiscible mode while the remaining components are distributed in the immiscible mode consisting of the two components is preferred. In this case, the structure of the polymer alloy is equivalent to the structure of an immiscible system consisting of two components. The following description is made in reference to a polymer alloy consisting of two resins contained as components.

Since the polymer alloy of this invention is immiscible under no shear flow, that is, in an equilibrium state, it belongs to a polymer alloy of an immiscible system in the above-mentioned classification. Even in an immiscible system, melt blending can induce spinodal decomposition. The polymer alloy of this invention is once-made miscible under such shear flow as caused by the shear rate kept in a range from 100 to 10000 $\sec^{-1}$ during melt blending, that is, in a non-equilibrium state, and is placed under no shear flow, to cause phase decomposition. So, it is a polymer alloy causing phase separation owing to the so-called shear induced spinodal decomposition.

The basic portion of the shear induced spinodal decomposition mode of this invention is the same as the spinodal decomposition in the above-mentioned general partially miscible system. Therefore, the following describes the spinodal decomposition in a general partially miscible system and subsequently additionally describes the portion peculiar to this invention.

In general, the phase separation caused by the spinodal decomposition refers to the phase separation caused in the unstable state inside the spinodal curve in a phase diagram showing the relation between the composition ratio of two different resins contained as components and the temperature. On the other hand, the phase separation caused by nucleation and growth refers to the phase separation caused in the metastable state inside the binodal curve and outside the spinodal curve in the phase diagram.

The spinodal curve refers to the curve drawn in the relation between the composition ratio and the temperature, at which curve the result ($\partial^2 \Delta Gmix/\partial\phi^2$) obtained by twice partially differentiating the difference ($\Delta Gmix$) between the free energy in the case where two different resins mixed as components are miscible, and the total of the free energies in immiscible two phases, with respect to the concentration ($\phi$), is 0. Inside the spinodal curve, an unstable state of $\partial^2 \Delta Gmix/\partial\phi^2 < 0$ occurs, and outside the spinodal curve, $\partial^2 \Delta Gmix/\partial\phi^2 > 0$ occurs.

The binodal curve refers to the curve at the boundary between a miscible system region and an immiscible system region in the relation between the composition ratio and the temperature.

A miscible state refers to a state where the components are homogeneously mixed on the molecular level. Particularly, it refers to a case where a mode consisting of different components does not form structure of 0.001 µm or more. Furthermore, an immiscible state refers to a case other than the miscible state. That is, it refers to a state where a mode consisting of different components forms structure of 0.001 µm or more. In this case, structure of 0.001 µm or more refers to a co-continuous structure with a wavelength of concentration fluctuation of 0.001 to 1 µm, or a dispersed structure with a distance between particles of 0.001 to 1 µm, etc. Being miscible or not can be judged using an electron microscope or differential scanning calorimeter (DSC) or any of various other methods, for example, as described in "Polymer Alloys and Blends, Leszek A. Utracki, Hanser Publishers, Munich Viema N.Y., P. 64."

According to the detailed theory, in spinodal decomposition, in the case where the temperature of a mixture system made homogeneously miscible once at a temperature of a miscible range is suddenly changed to a temperature of an unstable range, the system quickly initiates phase separation toward an equilibrium concentration. In this case, the concentration is made monochromatic into a certain wavelength, and a co-continuous structure in which both the separated phases are continuously and regularly entangled with each other at a wavelength of concentration fluctuation ($\Lambda m$), is formed. After this co-continuous structure is formed, while the wavelength of concentration fluctuation is kept constant, only the difference between the concentrations of both the phases increases. This stage is called the early stage of spinodal decomposition.

The wavelength of concentration fluctuation ($\Lambda m$) in the above-mentioned early stage of spinodal decomposition has thermodynamically the following relation.

$$\Lambda m \sim [|Ts-T|/Ts]^{-1/2}$$

(where Ts is the temperature on the spinodal curve)

The co-continuous structure refers to a structure in which both the resins mixed as components form continuous phases respectively and are three-dimensionally entangled with each other. A typical view of the co-continuous structure is described, for example, in "Polymer Alloys: Foundation and Applications (second edition) (Chapter 10.1) (in Japanese)" (Edited by the Society of Polymer Science, Japan: Tokyo Kagaku Dojin).

In the shear induced spinodal decomposition of this invention, the application of shear flow expands the miscible region. That is, since the spinodal curve is greatly changed due to the application of shear flow, the quench depth ($|Ts-T|$) becomes large even if the temperature change is equal, compared with the above-mentioned general spinodal decomposition in which the spinodal curve does not change. As a result, the wavelength of concentration fluctuation in the early stage of spinodal decomposition in the aforesaid formula can be easily shortened.

The method for controlling the wavelength of concentration fluctuation into a preferred specific value in the early stage is not especially limited. However, it is preferred to heat-treat at a temperature higher than the lowest temperature of the glass transition temperatures of the individual resins contained as the components constituting the polymer alloy and at a temperature capable of shortening the above-mentioned thermodynamically specified wavelength of concentration fluctuation. The glass transition temperature can be obtained from the inflection point identified during heating from room temperature at a heating rate of 20° C./min using a differential scanning calorimeter (DSC).

The temperature for making miscible, the temperature for inducing spinodal decomposition and other conditions depend on the combination of the resins and cannot be generally specified. However, these conditions can be decided by carrying out simple preliminary experiments based on the phase diagrams obtained under various shearing conditions.

The spinodal decomposition that has undergone the early stage as described above reaches the intermediate stage where the increase of wavelength and the increase of concentration difference occur simultaneously. After the concentration difference has reached the equilibrium concentration, the increase of wavelength occurs as if to follow autosimilarity in the late stage. After undergoing this stage, the spinodal decomposition progresses till finally the separation into two macroscopic phases occurs. In this invention, it is only required to fix the structure in the stage where a desired wavelength of concentration fluctuation has been reached before the final separation into two macroscopic phases. Furthermore, in the process where the wavelength increases from the intermediate stage to the late stage, it can happen that one phase becomes discontinuous due to the influence of the composition ratio or interfacial tension, to change from the aforesaid co-continuous structure to the dispersed structure. In this case, it is only required to fix the structure in the stage where a desired distance between particles has been reached.

The dispersed structure refers to a so-called sea-isles structure in which particles of one phase are dispersed in a matrix of the other continuous phase.

If is preferred to control the wavelength of concentration fluctuation in the early stage of spinodal decomposition into a range from 0.001 to 0.1 μm, since it is easy to control the structure into a co-continuous structure with the wavelength of concentration fluctuation kept in a range from 0.001 to 1 μm or into a dispersed structure with the distance between particles kept in a range from 0.001 to 1 μm, even if the wavelength and concentration difference increase in the above-mentioned intermediate and subsequent stages. Furthermore, as the final structure, a co-continuous structure with the wavelength of concentration fluctuation kept in a range from 0.01 to 0.5 μm or a dispersed structure with the distance between particles kept in a range from 0.01 to 0.5 μm is preferred for obtaining more excellent mechanical properties. Still furthermore, a co-continuous structure with the wavelength of concentration fluctuation kept in a range from 0.01 to 0.3 μm or a dispersed structure with the distance between particles kept in a range from 0.01 to 0.3 μm is more preferred.

The method for coarsening from the early stage is not especially limited. However, a method of heat-treating at a temperature higher than the lowest temperature among the glass transition temperatures of the individual resins contained as components constituting the polymer alloy can be preferably used. Furthermore, in the case where the polymer alloy has a single glass transition temperature in its miscible state or in the case where the glass transition temperature of the polymer alloy is between the glass transition temperatures of the individual resins contained as the components constituting the polymer alloy in a state where phase separation progresses, it is more preferred to heat-treat at a temperature higher than the lowest temperature among the glass transition temperatures in the polymer alloy. Moreover, in the case where one of the individual resins used as the components constituting the polymer alloy is a crystalline resin, it is preferred that the heat treatment temperature is higher than the crystal melting temperature of the crystalline resin, since the coarsening by the heat treatment can be effectively achieved. Moreover, it is preferred that the heat treatment temperature is within ±20° C. of the crystal melting temperature of the crystalline resin, since the coarsening can be easily controlled. It is more preferred that the heat treatment temperature is within ±10° C. of the crystal melting temperature. In the case where two or more of the resins used as the components are crystalline resins, it is preferred the heat treatment temperature is within ±20° C. of the highest crystal melting temperature among the crystal melting temperatures of the crystalline resins. It is more preferred that the heat treatment temperature is within ±10° C. of the highest crystal melting temperature.

The method for fixing the structure formed by the spinodal decomposition can be a method of fixing the structure(s) of either or both of the separated phases by quick cooling or the like. In the case where one of the components is thermosetting, a method of using the phenomenon that the phase formed by the thermosetting components cannot move freely after completion of a reaction can be used. In the case where one of the components is a crystalline resin, a method of using the phenomenon that the crystalline resin phase cannot move freely after crystallization can be used. Among them, in the case where a crystalline resin is used, a method of fixing the structure by means of crystallization can be preferably used.

On the other hand, in a system where nucleation and growth cause phase separation, a dispersed structure is formed as a sea-isles structure already in the early stage, and it grows. So, it is difficult to form a regularly arranged co-continuous structure with the wavelength of concentration fluctuation kept in a range from 0.001 to 1 μm or a regularly arranged dispersed structure with the distance between particles kept in a range from 0.001 to 1 μm as in this invention.

To confirm that the co-continuous structure or dispersed structure of this invention has been obtained, it is important to confirm a regular periodical structure. For this purpose, for example, the structure is observed with an optical microscope or transmission electron microscope, to confirm that a co-continuous structure is formed, and in addition, a light scattering instrument or small-angle X-ray scattering instrument is used for scattering measurement to confirm that a scattering maximum appears. The optimum measuring ranges of light scattering instruments and small-angle X-ray scattering instruments are different from instrument to instrument. So, an instrument with a measuring range suitable for the wavelength of concentration fluctuation should be selected. The existence of a scattering maximum in scattering measurement proves that a regularly phase-separated structure with a certain wavelength exists. The wavelength $\Lambda m$ corresponds to the wavelength of concentration fluctuation in the case of co-continuous structure, and corresponds to the distance between particles in the case of dispersed structure. The value can be calculated using the wavelength $\lambda$ of scattered light in a scattering body and the scattering angle $\theta m$ giving the scattering maximum from the following formula:

$$\Lambda m = (\lambda/2)/\sin(\theta m/2)$$

To induce the spinodal decomposition, it is necessary to once make the two or more resins contained as components miscible and then to arrive at the unstable state inside the spinodal curve. In the spinodal decomposition in a general partially miscible system, if the temperature is quickly changed to an immiscible range after melt blending in a miscible condition, the spinodal decomposition can be induced. On the other hand, in the shear induced spinodal decomposition of this invention, since the resins are made miscible under such shear flow as caused by the shear rate kept in a range from 100 to 10000 $sec^{-1}$ during melt blending in an immiscible system, the spinodal decomposition can be induced merely under no shear flow.

The range of the shear rate must be a range for allowing melt blending. Especially a range from 500 $sec^{-1}$ to 5000 $sec^{-1}$ is preferred, and a range from 1000 $sec^{-1}$ to 3000 $sec^{-1}$ is more preferred.

For obtaining the shear rate for example using a parallel plates type shear flow applying device, resins molten by heating to a predetermined temperature are placed between parallel discs, and the shear rate can be obtained from $\omega \times r/h$, where r is the distance from the center, h is the distance between the parallel discs and $\omega$ is the angular speed of rotation.

The melt blending method for keeping the shear rate in this range is not especially limited. As a preferred particular manufacturing method, the resins are melt blending in the kneading zone of a twin-screw extruder at a high shear stress, to be made miscible. The shearing condition and temperature condition for making miscible depend on the molecular weights of the resins and cannot be generally specified. However, the conditions can be decided by carrying out simple preliminary experiments based on phase diagrams obtained under various shearing conditions. To change the shearing condition, it is effective to adjust the number of kneading blocks of the extruder or to adjust the screw rotated speed.

The combination of resins that can be separated into phases by the shear-induced spinodal decomposition is a combination of resins that are immiscible under no shear flow and are miscible under shear flow, allowing the spinodal decomposition to be induced by the change from shear flow to no shear flow. Particularly, such combinations include, for example, a combination consisting of a polycarbonate (PC) and styrene-acrylonitrile copolymer, a combination consisting of PC and a thermoplastic polyester resin (more particularly, a combination consisting of PC and polybutylene terephthalate (PBT), a combination consisting of PC and polyethylene terephthalate, and a combination consisting of PC and polypropylene terephthalate), a combination consisting of polystyrene and polyvinyl methyl ether, a combination consisting of polystyrene and polyisoprene, a combination consisting of polystyrene and polyphenylmethylsiloxane, a combination consisting of ethylene-vinyl acetate copolymer and chlorinated polyethylene, a combination consisting of poly (butyl acrylate) and chlorinated polyethylene, a combination consisting of polymethyl methacrylate and styrene-acrylonitrile copolymer, a combination consisting of polypropylene and high density polyethylene, a combination consisting of polypropylene and ethylene-$\alpha$-olefin copolymer, a combination consisting of polypropylene and ethylene-polypropylene copolymer, a combination consisting of polypropylene and styrene-butadiene copolymer, a combination consisting of polypropylene and the hydrogenation product of styrene-butadiene copolymer, a combination consisting of PC and styrene-butadiene copolymer, a combination consisting of PC and the hydrogenation product of styrene-butadiene copolymer, a combination consisting of PBT and styrene-butadiene copolymer, a combination consisting of PBT and the hydrogenation product of styrene-butadiene copolymer, etc. Among them, a combination consisting of PC and styrene-acrylonitrile copolymer, a combination consisting of PC and PBT, a combination consisting of polypropylene and high density polyethylene, a combination consisting of polypropylene and an ethylene-$\alpha$-olefin copolymer, and a combination consisting of polypropylene and ethylene-polypropylene copolymer are preferred since they have excellent mechanical properties. Especially a combination consisting of PBT and PC is preferred.

A thermoplastic polyester resin refers to a saturated polyester resin synthesized by an esterification reaction from a dibasic acid or any of its ester-formable derivatives and a diol or any of its derivatives.

The basic acids and their ester-formable derivatives include aromatic dicarboxylic acids such as terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyletherdicarboxylic acid, and 5-sodiumsulfoisophthalic acid, aliphatic dicarboxylic acids such as adipic acid, sebacic acid, azelaic acid, and dodecanedioic acid, alicyclic dicarboxylic acids such as 1,3-cyclohexanedicarboxylic acid and 1,4-cyclohexanedicarboxylic acid, their lower alcohol esters, etc. The diols and their derivatives include aliphatic glycols with 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, and cyclohexanediol, and long-chain glycols with a molecular weight of 400 to 6000 such as polyethylene glycol, poly-1,3-propylene glycol, polytetramethylene glycol, their ester-formable derivatives, etc.

Preferred examples of these polymers and copolymers include polybutylene terephthalate, polybutylene(terephthalate/isophthalate), polybutylene(terephthalate/adipate), polybutylene(terephthalate/sebacate), polybutylene(terephthalate/decanedicarboxylate), polybutylene naphthalate, polyethylene terephthalate, polyethylene(terephthalate/isophthalate), polyethylene(terephthalate/adipate), polyethylene(terephthalate/5-sodiumsulfoisophthalate), polybutylene(terephthalate/5-sodiumsulfoisophthalate), polyethylene naphthalate, polycyclohexanedimethylene terephthalate, polypropylene terephthalate, etc. Among them, polybutylene terephthalate, polybutylene(terephthalate/adipate), polybutylene(terephthalate/decanedicarboxylate), polybutylene naphthalate, polyethylene terephthalate, polyethylene (terephthalate/adipate), polyethylene naphthalate, polycyclohexanedimethylene terephthalate, and polypropylene terephthalate are especially preferred. The most preferred is polybutylene terephthalate.

Among these polymers and copolymers, a polymer or copolymer with an intrinsic viscosity of 0.36 to 1.60 as measured at 25° C. using o-chlorophenol solution is preferred in view of moldability and mechanical properties. A polymer or copolymer with its intrinsic viscosity of 0.52 to 1.25 is especially preferred and 0.6 to 1.0 is most preferred.

The polycarbonates include those obtained using one or more selected from bisphenol A, i.e., 2,2'-bis (4-hydroxyphenyl)propane, 4,4'-dihydroxydiphenylalkane, 4,4'dihydroxydiphenylsulfone and 4,4'-dihydroxydiphenyl ether as main raw materials. Among them, a polycarbonate produced using bisphenol A, i.e., 2,2'-bis(4-hydroxyphenyl)propane as a main raw material is preferred. Particularly, a polycarbonate obtained by an ester interchange method or phosgene method using, for example, bisphenol A as a dihydroxy components is preferred. Furthermore, a compound obtained by substituting a part, preferably 10 mol % or less of bisphenol A, for example, by 4,4'-dihydroxydiphenylalkane, 4,4'-dihdyroxydiphenylsulfone, or 4,4'-dihydroxydiphenyl ether can also be preferably used.

Furthermore, to the polymer alloy consisting of two resins contained as components, a third components such as a copolymer, for example, a block copolymer, graft copolymer or random copolymer respectively containing the components constituting the polymer alloy can be preferably added, for such reasons that the free energy at the interface between the separated phases can be lowered and that the wavelength of concentration fluctuation in the co-continuous structure or the distance between particles in the dispersed structure can be easily controlled. In this case, since the third components such as a copolymer is usually distributed into the respective phases of the polymer alloy consisting of two resins contained as components excluding the third components, the polymer alloy obtained can be handled like the polymer alloy consisting of two resins contained as components.

The second version of this invention is polymer alloy pellets, comprising at least two resins contained as components immiscible under no shear flow, wherein the said at least two resins contained as components are made miscible.

In this invention, the polymer alloy immiscible in an equilibrium state, i.e., under no shear flow is melt blended to be made miscible, and in this state, the structure in the obtained polymer alloy pellets is fixed.

In this invention, making miscible refers to a state where the components are homogeneously mixed on the molecular level, particularly refers to a case where none of at least two resins contained as components forms phase structure of 0.001 µm or more. This state of being free from the structure can be judged if a very thin section is cut out of a thermoplastic resin pellet and is observed with a high-magnification electron microscope.

The polymer alloy pellets of this invention can be manufactured by making at least two resins contained as components miscible, for example, by means of melt blending and quickly cooling them before initiation of spinodal decomposition, for fixing the structure with the miscible state kept as it is. As a particular manufacturing method, the at least two resins contained as components are made miscible by melt blending at a high shear stress in the kneading zone of a twin-screw extruder, and are discharged as a strand that is then quickly cooled in water, to obtain pellets with the miscible state kept as it is. The high shear stress state can be formed for making the polymer alloy miscible by using more kneading blocks in the extruder, lowering the resin temperature and enhancing the screw rotated speed. Furthermore, lest the polymer alloy made miscible should cause spinodal decomposition when melt-retained in the retaining portion free from shear stress inside the die of the extruder, it is preferred that the retention time in the die is kept short. Moreover, if the temperature of cooling water is kept low, the molten resin composition can be quickly cooled to fix the structure with the miscible state kept as it is.

The shape of the polymer alloy pellets of this invention is not especially limited, but to allow publicly known plastic processing such as injection molding or extrusion molding, it is preferred that the pellets have a suitable size and shape. Particular examples are cylinders having a diameter of 1 to 6 mm, preferably 1.5 to 4 mm and a length of 2 to 6 mm, preferably 2.5 to 4 mm and rectangular parallelepipeds having a length and a width of respectively 3 to 6 mm and a thickness of 1.5 to 3 mm.

As the resins used for the polymer alloy pellets of this invention, combinations consisting of resins immiscible under no shear flow and capable of being made miscible by melt blending, as described for the first version of this invention, can be preferably used. Among them, a combination consisting of a PC resin and a thermoplastic polyester resin is preferred, and especially a combination consisting of PC and PBT is preferred.

It is also preferred that the polymer alloy pellets of this invention contain inert particles. The inert particles include polymeric crosslinked particles, alumina particles, spherical silica particles, cohesive silica particles, aluminum silicate particles, calcium carbonate particles, titanium oxide particles, kaolin particles, etc. Among them, polymeric crosslinked particles, alumina particles, spherical silica particles and aluminum silicate particles can be preferably used. It is preferred that the average particle size of the inert particles is 0.001 to 5 µm, and a more preferred range is from 0.01 to 3 µm. Furthermore, it is preferred that the mixing rate of inert particles is 0.01 to 10 wt % per 100 wt % of polymer alloy pellets. A more preferred range is from 0.05 to 5 wt %. An inert particles-mixing rate of less than 0.01 wt % is not preferred, since the sliding property during the molding for producing a film or sheet may be so poor as to lower moldability. On the contrary, an inert particles-mixing rate of more than 10 wt % is not preferred either, since the toughness may decline.

It is also preferred that the polymer alloy pellets of this invention contain a releasing agent. Usable releasing agents include the ester compounds obtained from a long-chain aliphatic carboxylic acid such as stearic acid or montanic acid and a polyhydric alcohol such as ethylene glycol, glycerol or pentaerythritol, amide compounds obtained from a long-chain aliphatic carboxylic acid such as stearic acid or montanic acid and stearylamine or ethylenediamine, etc., silicone compounds, etc. Preferred particular examples of the releasing agent are ethylene glycol ester and ethylene bisstearylamide of montanic acid, etc.

It is preferred that the mixing rate of the releasing agent is 0.001 to 1 wt % per 100 wt % of polymer alloy pellets, and a more preferred range is from 0.005 to 0.8 wt %. A releasing agent-mixing rate of less than 0.001 wt % is not preferred, since the releasability during injection molding may become so poor as to lower moldability. On the contrary, a releasing agent-mixing rate of more than 1 wt % is not preferred either, since the releasing agent may bleed out on the surface of the molded article to degrade the appearance of the molded article or to contaminate the mold.

The releasing agent can be entirely contained in the polymer alloy pellets, but it is also preferred that the releasing agent exists partially or entirely on the surfaces of the polymer alloy pellets.

The polymer alloy pellets of this invention can further contain various additives to such an extent that the object of this invention is not impaired. These additives include, for example, reinforcing materials such as talc, kaolin, mica, clay, bentonite, sericite, basic magnesium carbonate, aluminum hydroxide, glass flakes, glass fibers, carbon fibers, asbestos fibers, rock wool, calcium carbonate, silica sand, wollastonite, barium sulfate, glass beads and titanium oxide, non-tabular filler, antioxidant (based on phosphorus, sulfur, etc.), ultraviolet light absorber, thermal stabilizer (based on hindered phenol, etc.), ester interchange reaction inhibitor, lubricant, antioxidant, blocking preventive, colorant such as dye or pigment, flame retarder (based on halogen, phosphorus, etc.), flame retardant auxiliary (antimony compound typified by antimony trioxide, zirconium oxide, molybdenum oxide, etc.), foaming agent, coupling agent (silane coupling agent or titanium coupling agent containing one or more kinds of epoxy group, amino group, mercapto group, vinyl group and isocyanate group), antimicrobial agent, etc.

The polymer alloy pellets of this invention can be manufactured by any desired molding method, and the molded pellets can have a desired shape. Molding methods include, for example, melt spinning, injection molding, extrusion molding, inflation molding, blow molding, etc. The individual molding methods are described later in detail.

The third version of this invention is polymer alloy pellets, comprising at least two resins contained as components, wherein the at least two resins contained as components form a co-continuous structure with a wavelength of concentration fluctuation of 0.001 to 1 µm or a dispersed structure with a distance between particles of 0.001 to 1 µm.

The co-continuous structure and the dispersed structure of this invention can be confirmed as described for the first version of this invention.

It is necessary that the pellets of this invention have a co-continuous structure with a wavelength of concentration fluctuation of 0.001 to 1 µm or a dispersed structure with a distance between particles of 0.001 to 1 µm. It is preferred that the pellets have a co-continuous structure with a wavelength of concentration fluctuation of 0.001 to 0.4 µm or a dispersed structure with a distance between particles of 0.001 to 0.4 µm. A wavelength of concentration fluctuation of more than 0.4 µm is not preferred, since the toughness of the molded article obtained by molding the polymer alloy pellets declines.

As a method for obtaining the co-continuous structure and the dispersed structure, a method of using the phase separation caused by spinodal decomposition is preferred.

In general, a polymer alloy consisting of two resins contained as components has a miscible system, immiscible system or partially miscible system. These systems are the same as those described for the first version of this invention.

As the method for manufacturing the polymer alloy pellets of this invention, a method by melt blending is preferred. As a particular manufacturing method, at least two resins used as components can be melt blended at a high shear stress in the kneading zone of a twin-screw extruder, to be made miscible, separated into phases by spinodal decomposition in the extruder, and discharged as a strand that is then cooled by cooling water, to obtain polymer alloy pellets having a fixed co-continuous structure with a wavelength of concentration fluctuation of 0.001 to 1 µm or a fixed dispersed structure with a distance between particles of 0.001 to 1 µm. If the polymer alloy made miscible can be melt-retained in the retaining portion free from shear stress in the die of the extruder, the spinodal decomposition can be initiated. If the retention time in the die is made longer or if the cooling water is made warmer, for gradually cooling the molten polymer alloy, a time available for inducing the early stage of spinodal decomposition can be produced. The retention time in the die can be adjusted if the inside volume of the die is changed or if the amount of the resin composition discharged is changed.

The shape of the polymer alloy pellets of this invention is not especially limited, but to allow publicly known plastic processing such as injection molding or extrusion molding, it is preferred that the pellets have a suitable size and shape. Particular examples are cylinders having a diameter of 1 to 6 mm, preferably 1.5 to 4 mm and a length of 2 to 6 mm, preferably 2.5 to 4 mm and rectangular parallelepipeds having a length and a width of respectively 3 to 6 mm and a thickness of 1.5 to 3 mm.

The resins used for the polymer alloy pellets of this invention are not especially limited, and combinations of resins described for the first version of this invention can be preferably used. Furthermore, the polymer alloy pellets of this invention can also contain inert particles, releasing agent and various other additives, as described for the second version of this invention. Also as the molding methods for the polymer alloy pellets of this invention, the methods described for the second version of this invention can be applied.

The fourth version of this invention is a polymer alloy film or sheet, comprising at least two resins contained as components, wherein the at least two resins contained as components form a co-continuous structure with a wavelength of concentration fluctuation of 0.001 to 1 µm or a dispersed structure with a distance between particles of 0.001 to 1 µm.

As the method for obtaining the polymer alloy film or sheet, the method of using the spinodal decomposition described for the first version of this invention is preferred. It is preferred to control the wavelength of concentration fluctuation in a range from 0.001 to 0.1 µm in the early stage of spinodal decomposition, since it is easy to control the structure for securing a co-continuous structure with the wavelength of concentration fluctuation kept in a range from 0.001 to 1 µm or a dispersed structure with the distance between particles kept in a range from 0.001 to 1 µm, even if the wavelength and concentration difference increase in the above-mentioned intermediate and subsequent stages.

To induce the spinodal decomposition, it is necessary to make the two or more resins contained as components miscible, and then to arrive at the unstable state inside the spinodal curve. The methods for making the two or more resins contained as components miscible include a solvent casting method and a melt blending method. A solvent casting method refers to a method in which after dissolving into a common solvent, the solution is transformed into a film or the like by means of spray drying, freeze drying, solidification in a non-solvent substance or solvent evaporation. A melt blending method refers to a method in which resins of a partially miscible system or an immiscible system are melt blended, to be made miscible. Among them, a melt blending method that is a dry process free from the use of any solvent can be practically preferably used. As the methods for fixing the structural product achieved by spinodal decomposition, the methods described for the first version of this invention can be used.

In the case where at least one of the resins contained as the components constituting the polymer alloy is a crystalline resin, the structure of the polymer alloy can be easily fixed by crystallizing the crystalline resin phase, and in addition, when the film or sheet is stretched, the oriented crystallization achieved by the stretching improves the mechanical properties. So, it is preferred to use a crystalline resin as at least one of the components.

The crystalline resin referred to in this invention is not especially limited, if the resin allows the crystal melting temperature to be observed by a differential scanning calorimeter (DSC). For example, polyester resins, polyamide resins, polyolefins such as polyethylene, polypropylene, polyvinyl alcohol and polyvinyl chloride, polyoxymethylene and so on can be enumerated.

As a method for manufacturing the polymer alloy film or sheet, a single-screw or twin-screw extruder is used to once dissolve at least two resins used as components, and the polymer alloy obtained is discharged from a T die and cooled for inducing the spinodal decomposition. Subsequently the structure achieved by the spinodal decomposition is fixed. More particular methods include a method in which the spinodal decomposition induced after discharge is followed by cooling and solidification using a casting drum, for fixing the structure, a polishing method in which the discharged miscible polymer alloy is formed between two rolls, a calendering method, etc. The method is not especially limited here. For keeping the molten resins in contact with a casting drum for casting, such methods as a method of applying static electricity, a method of using an air knife, a method of using a holding drum in opposite to the casting drum can also be used. Furthermore, for casting using a casting drum, it is preferred to install the casting drum immediately below the discharge port, for quick cooling. Moreover, it is more preferred to use polymer alloy pellets made miscible using a twin-screw extruder before feeding them into an extruder for manufacturing a film or sheet.

In the case where a polymer alloy of an immiscible system is used, it is possible to use the phase separation caused by the so-called shear induced spinodal decomposition as described for the first version of this invention, in which the polymer alloy is melt blended under high shear flow for being made miscible and separated into phases under no shear flow when it is discharged from a T die.

The shear induced phase dissolution and phase decomposition of an immiscible system can be more preferably used, since the wavelength of concentration fluctuation in the early stage of spinodal decomposition can be easily shortened compared with that of a partially miscible system, as described for the first version of this invention.

The combinations of resins to be subjected to the aforesaid shear induced spinodal decomposition are the same as described for the first version of this invention, and especially a polymer alloy containing PBT and PC is preferred, since the obtained polymer alloy film or sheet can have excellent strength and toughness, and also excellent moldability.

In the case where a polymer alloy of a partially miscible system is used, the polymer alloy is melt blended to be made miscible under conditions for making the resins of a partially miscible system miscible. After discharge, the following method can be used. Usually an atmospheric temperature in a range from 10 to 30° C. is used for cooling to induce the spinodal decomposition, and further, a casting drum is used for cooling and solidification, to fix the structure achieved by the spinodal decomposition. In the case where a polishing method or a calendering method is used, it is desirable to adjust the temperature of the rolls used for forming the discharged polymer alloy at the temperature capable of inducing spinodal decomposition.

Furthermore, in the case where a polymer alloy of a partially miscible system is used, at least two resins contained as components capable of being separated into phases by spinodal decomposition are used in combination. Such a system of two components can be realized by selecting a combination consisting of resins small in the difference of solubility parameter or using a resin with a low molecular weight as one of the resins.

As partially miscible systems, known are a composition with a low temperature miscible type phase diagram, which is likely to be made miscible in a low temperature range, and on the contrary, a composition with a high temperature miscible type phase diagram, which is likely to be made miscible in a high temperature range. The lowest temperature among the temperatures demarcating between a miscible zone and an immiscible zone in the low temperature miscible type phase diagram is called the lower critical solution temperature (LCST), and the highest temperature among the temperatures demarcating between a miscible zone and an immiscible zone in the high temperature miscible type phase diagram is called the upper critical solution temperature (UCST).

In the case of a low temperature miscible type phase diagram, if the two or more resins contained as components made miscible from a partially miscible system are brought to a temperature higher than the LCST and inside the spinodal curve, spinodal decomposition can be induced. In the case of a high temperature miscible type phase diagram, if they are brought to a temperature lower than the UCST and inside the spinodal curve, spinodal decomposition can be induced. When a film or sheet is formed, it is simpler to induce the spinodal decomposition when the resins made miscible in the extruder are discharged to decline in temperature. So, a combination of resins having a low temperature miscible type phase diagram is preferred.

Combinations of resins having the aforesaid low temperature miscible type phase diagram include a combination consisting of polyvinyl chloride and a poly(n-alkyl methacrylate), a combination consisting of polyvinyl chloride and a poly(n-alkyl acrylate), a combination consisting of polyvinylphenol and a poly(n-alkyl methacrylate), a combination consisting of polydimethylsiloxane and polystyrene, a combination consisting of polyvinylidene fluoride and poly(methyl methacrylate), a combination consisting of polyvinylidene fluoride and polyvinyl acetate, a combination consisting of polyvinylidene fluoride and poly (methyl acrylate), a combination consisting of polyvinylidene fluoride and poly(ethyl acrylate), a combination consisting of polyvinyl acetate and poly(methyl acrylate), a combination consisting of polystyrene and polyvinylmethylether, a combination consisting of poly(methyl methacrylate) and styrene-acrylonitrile copolymer, a combination consisting of poly(methyl methacrylate) and vinylphenol-styrene copolymer, a combination consisting of polyvinyl acetate and vinylidene fluoride-hexafluoroacetone copolymer, a combination consisting of tetramethyl polycarbonate and styrene-methyl methacrylate copolymer, a combination consisting of tetramethyl polycarbonate and styrene-acrylonitrile copolymer, a combination consisting of polyvinylphenol and ethylene-methyl methacrylate copolymer, a combination consisting of polyvinylphenol and ethylene-vinyl acetate copolymer, a combination consisting of poly-ε-caprolactone and styrene-acrylonitrile copolymer, a combination consisting of polyisoprene and butadiene-vinylethylene copolymer, a combination consisting of styrene-acrylonitrile copolymer and styrene-maleic anhydride copolymer, a combination consisting of styrene-acrylonitrile copolymer and styrene-N-phenylmaleimide, a combination consisting of ethylene-vinyl acetate copolymer and vinylidene fluoride-hexafluoroacetone copolymer, etc.

In the polymer alloy film or sheet obtained by such a method, it is necessary that at least two resins contained as components have a co-continuous structure with a wavelength of concentration fluctuation of 0.001 to 1 μm or a dispersed structure with a distance between particles of 0.001 to 1 μm. Furthermore, a co-continuous structure with a wavelength of concentration fluctuation of 0.001 to less than 0.01 μm or a dispersed structure with a distance between particles of 0.001 to less than 0.01 μm is preferred, and a co-continuous structure with a wavelength of concentration fluctuation of 0.002 to 0.008 μm or a dispersed structure with a distance between particles of 0.002 to 0.008 μm is also preferred, since excellent mechanical properties can be obtained. A co-continuous structure with a wavelength of concentration fluctuation of 0.002 to 0.005 μm or a dispersed structure with a distance between particles of 0.002 to 0.005 μm is more preferred.

The obtained film can also be stretched. The stretching method is not especially limited, and either sequential biaxial stretching or simultaneous biaxial stretching can be used. Often used stretching ratios are in a range from 2 times to 8 times, and often used stretching speeds are in a range from 500 to 5000%/min. Furthermore, as for the heat treatment temperature during stretching, a method of heat-treating at higher than the lowest temperature among the glass transition temperatures of the individual resins contained as components constituting the polymer alloy is usually preferably used. In the case where the polymer alloy has a single glass transition temperature in its miscible state or in the case where the glass transition temperature of the polymer alloy is between the glass transition temperatures of the individual resins used as the components constituting the polymer alloy in a state where phase separation progresses, it is more preferred to heat-treat at a temperature higher than the lowest temperatures among the glass transition temperatures in the polymer alloy. Moreover, in the case where one of the individual resins contained as the components constituting the polymer alloy is a crystalline resin, it is preferred that the heat treatment temperature is lower than the heating crystallization temperature of the crystalline resin, since stretching is unlikely to be disturbed by the crystallization of the crystalline resin. It is preferred that the stretched film is further heat-treated for stabilizing its structure before use. As for the heat treatment temperature for stabilization, a method of heat-treating at a temperature higher than the lowest temperature among the glass transition temperatures of the individual resins contained as the components constituting the polymer alloy is usually preferably used. In the case where the glass transition temperature of the polymer alloy is between the glass transition temperatures of the individual resins contained as the components constituting the polymer alloy in a state where phase separation progresses, it is more preferred to heat-treat at a temperature higher than the lowest temperature among the glass transition temperatures in the polymer alloy. Furthermore, the stretched polymer alloy film can have a longer wavelength of concentration fluctuation or a longer distance between particles because of the stretching. It is preferred that at least two resins contained as components in the stretched polymer alloy film have a co-continuous structure with a wavelength of concentration fluctuation of 0.001 to 1 μm or a dispersed structure with a distance between particles of 0.001 to 1 μm, since excellent mechanical properties can be obtained. Furthermore, having a co-continuous structure with a wavelength of concentration fluctuation of 0.001 to 0.1 μm or a dispersed structure with a distance between particles of 0.001 to 0.1 μm is preferred in view of the transparency of the film.

The composition ratio of the resins contained as the components constituting the polymer alloy film or sheet in this invention is not especially limited, but in the case of two components, usually a range from 95 wt %/5 wt % to 5 wt %/95 wt % can be preferably used, and a range from 90 wt %/10 wt % to 10 wt %/90 wt % can be more preferably used. Especially a range from 75 wt %/25 wt % to 25 wt %/75 wt % can be preferably used, since it is relatively easy to obtain the co-continuous structure.

Furthermore, to the polymer alloy consisting of two resins contained as components, a third components such as a copolymer, for example, a block copolymer, graft copolymer or random copolymer respectively containing the components constituting the polymer alloy can be preferably added, for such reasons that the free energy at the interface between the separated phases can be lowered and that the wavelength of concentration fluctuation in the co-continuous structure or the distance between particles in the dispersed structure can be easily controlled. In this case, since the third components such as a copolymer is usually distributed into the respective phases of the polymer alloy consisting of two resins contained as components excluding the third components, the polymer alloy obtained can be handled like the polymer alloy consisting of two resins contained as components.

The polymer alloy film or sheet of this invention can contain further other various additives to such an extent that the object of this invention is not impaired. These other additives include, for example, a lubricant such as inorganic particles and/or crosslinked organic particles, antioxidant (based on phosphorus, sulfur, etc.), ultraviolet light absorber, thermal stabilizer (based on hindered phenol, etc.), releasing agent, antioxidant, blocking preventive, colorant such as dye or pigment, antimicrobial agent, etc.

These additives can be mixed at any desired stage while the polymer alloy film or sheet of this invention is manufactured, a method of producing a master batch by adding these additives to one of the resins constituting the polymer alloy and adding the master batch can be usually preferably used.

The fifth version of this invention is a molded polymer alloy article, comprising at least two resins contained as components, wherein the at least two resins contained as components form a co-continuous structure with a wavelength of concentration fluctuation of 0.001 to 1 μm or a dispersed structure with a distance between particles of 0.001 to 1 μm.

As the method for obtaining a molded polymer alloy article having such a structure, the method of using the spinodal decomposition described for the first version of this invention is preferred. Furthermore, it is preferred to control the wavelength of concentration fluctuation in a range from 0.001 to 0.1 μm in the early stage of spinodal decomposition, since it is easy to control the structure for securing a co-continuous structure with the wavelength of concentration fluctuation kept in a range from 0.001 to 1 μm or a dispersed structure with the distance between particles kept in a range from 0.001 to 1 μm, even if the wavelength and concentration difference increase in the above-mentioned intermediate and subsequent stages. Moreover, for obtaining more excellent properties, it is more preferred to control the structure after coarsening for securing a co-continuous structure with the wavelength of concentration fluctuation kept in a range from 0.002 to 0.5 μm or a dispersed structure with the distance between particles kept in a range from 0.002 to 0.5 μm. It is more preferred to control the structure for securing a co-continuous structure with the wavelength of concentration fluctuation kept in a range from 0.003 to 0.3 μm or a dispersed structure with the distance between particles kept in a range from 0.003 to 0.3 μm.

The method for inducing the spinodal decomposition is the same as described for the fourth version of this invention. In this invention, a combination consisting of polybutylene terephthalate (PBT) and a polycarbonate (PC) can be preferably used, since excellent mechanical strength can be obtained. The PBT and PC preferably used in this invention are as described for the first version of this invention.

The amounts of PBT and PC to be mixed are not especially limited, but it is preferred to use 10 to 1000 parts by weight of PC per 100 parts by weight of PBT. It is more preferred to use 10 to 100 parts by weight of PC per 100 parts by weight of PBT. For obtaining a molded long article or a molded precision article, it is preferred to keep the amount of PC at 100 parts by weight or less, lest the flowability during injection molding should decline. A PC amount of less than 10 parts by weight is not preferred, since the effect of improving dimensional stability declines. In view of the balance between flowability and dimensional stability, it is more preferred to use 20 to 50 parts by weight of PC per 100 parts by weight of PBT.

The molded polymer alloy article of this invention is a molded article having a three-dimensional structure. The molding method can be, for example, injection molding, extrusion molding, inflation molding, or blow molding, etc. Among them, injection molding can be preferably used, since the structure can be fixed in the mold.

As a preferred method for manufacturing the molded polymer alloy article of this invention, at least two resins used as components are once made miscible in a twin-screw extruder capable of applying high shear flow, are discharged from the extruder, to be immediately cooled, for producing pellets with their structure fixed in a state where the two resins contained as components are kept miscible, or producing pellets having a co-continuous structure with a wavelength of concentration fluctuation of 0.4 µm or less in the early stage of spinodal decomposition. Then, the pellets are injection-molded to further inducing spinodal decomposition during injection molding, to produce a molded polymer alloy article having a co-continuous structure with a wavelength of concentration fluctuation of 0.001 to 1 µm or a dispersed structure with a distance between particles of 0.001 to 1 µm.

The polymer alloy constituting the molded polymer alloy article of this invention can contain further various additives to such an extent that the object of this invention is not impaired. These additives include, for example, reinforcing materials such as talc, kaolin, mica, clay, bentonite, sericite, basic magnesium carbonate, aluminum hydroxide, glass flakes, glass fibers, carbon fibers, asbestos fibers, rockwool, calcium carbonate, silica sand, wollastonite, barium sulfate, glass beads and titanium oxide, non-tabular filler, antioxidant (based on phosphorus, sulfur, etc.), ultraviolet light absorber, thermal stabilizer (based on hindered phenol, etc.), ester interchange reaction inhibitor, lubricant, antioxidant, blocking preventive, colorant such as dye or pigment, flame retarder (based on halogen, phosphorus, etc.), flame retardant auxiliary (antimony compound typified by antimony trioxide, zirconium oxide, molybdenum oxide, etc.), foaming agent, coupling agent (silane coupling agent or titanium coupling agent containing one or more kinds of epoxy group, amino group, mercapto group, vinyl group and isocyanate group), antimicrobial agent, etc.

These additives can be added at any desired stage while the molded polymer alloy article of this invention is manufactured. For example, such methods as a method of adding simultaneously when the two resins used as components are mixed, a method of adding after the two resins used as components have been melt blended, and a method of adding at first to one of the two resins used as components, melt blending and mixing the other resin can be used.

Furthermore, the molded polymer alloy article of this invention can also contain another thermoplastic resin or thermosetting resin to such an extent that the structure of this invention is not impaired. The thermoplastic resins include, for example, polyethylene, polyamides, polyphenylene sulfide, polyether ether ketone, liquid crystal polyesters, polyacetal, polysulfones, polyether sulfones, polyphenylene oxide, etc. The thermosetting resins include, for example, phenol resins, melamine resins, unsaturated polyester resins, silicone resins, epoxy resins, etc.

The other thermoplastic resin or thermosetting resin can be mixed at any stage while the molded polymer alloy article of this invention is manufactured. For example, such methods as a method of adding simultaneously when the two resins used as components are mixed, a method of adding after the two resins used as components have been melt blended, or a method of adding at first to one of the two resins used as components, melt blending and mixing the other resin can be used.

The sixth version of this invention is a polymer alloy, comprising polybutylene terephthalate and a polycarbonate, and forming a co-continuous structure with a wavelength of concentration fluctuation of 0.001 to 1 µm or a dispersed structure with a distance between particles of 0.001 to 1 µm.

The PBT and PC preferably used in this invention are the same as described for the first version of this invention.

The amounts of PBT and PC to be mixed are not especially limited, but it is preferred to use 10 to 1000 parts by weight of PC per 100 parts by weight of PBT. It is more preferred to use 10 to 100 parts by weight of PC per 100 parts by weight of PBT.

The polymer alloy of this invention has a co-continuous structure having a specific wavelength of concentration fluctuation or a dispersed structure with a specific distance between particles.

The polymer alloy having such a structure can be obtained by using the phase separation caused by the spinodal decomposition, as described for the first version of this invention. If the wavelength of concentration fluctuation in the early stage of spinodal decomposition is controlled in a range from 0.001 to 0.1 µm, the structure can be controlled to ensure a co-continuous structure with the wavelength of concentration fluctuation kept in a range from 0.001 to 1 µm or a dispersed structure with the distance between particles kept in a range from 0.001 to 1 µm, even if the wavelength and the concentration difference increase in the intermediate and subsequent stages.

The method for inducing the spinodal decomposition is the same as described for the fourth version of this invention.

The polymer alloy of this invention can also contain further various additives to such an extent that the object of this invention is not impaired. These additives include, for example, reinforcing materials such as talc, kaolin, mica, clay, bentonite, sericite, basic magnesium carbonate, aluminum hydroxide, glass flakes, glass fibers, carbon fibers, asbestos fibers, rock wool, calcium carbonate, silica sand, wollastonite, barium sulfate, glass beads and titanium oxide, non-tabular filler, antioxidant (based on phosphorus, sulfur, etc.), ultraviolet light absorber, thermal stabilizer (based on hindered phenol, etc.), ester interchange reaction inhibitor, lubricant, antioxidant, blocking preventive, colorant such as dye or pigment, flame retarder (based on halogen, phosphorus, etc.), flame retardant auxiliary (antimony compound typified by antimony trioxide, zirconium oxide, molybdenum oxide, etc.), foaming agent, coupling agent (silane coupling agent or titanium coupling agent containing one or more kinds of epoxy group, amino group, mercapto group, vinyl group and isocyanate group), antimicrobial agent, etc.

These additives can be added at any desired stage while the polymer alloy of this invention is manufactured. For example, such methods as a method of adding simultaneously when PBT and PC are mixed, a method of adding after PBT and PC have been melt blended, and a method of adding at first to either PBT or PC resin, melt blending and mixing the remaining resin can be used.

The polymer alloy of this invention can further contain another thermoplastic resin or thermosetting resin to such an extent that the structure of this invention is not impaired. The thermoplastic resins include, for example, polyethylene, polyamides, polyphenylene sulfide, polyether ether ketone, liquid crystal polyesters, polyacetal, polysulfones, polyether sulfones, polyphenylene oxide, etc. The thermosetting resins include, for example, phenol resins, melamine resins, unsaturated polyester resins, silicone resins, epoxy resins, etc.

The other thermoplastic resin or thermosetting resin can be mixed at any stage while the polymer alloy of this invention is manufactured. For example, such methods as a method of adding simultaneously when PBT and PC are mixed, a method of adding after PBT and PC have been melt blended, or a method of adding at first to either PBT resin or PC resin, melt blending and mixing the remaining resin can be used.

The polymer alloy obtained in this invention can be molded by any desired method, for obtaining fibers, film, sheet or molded article, etc. The molding method can be, for example, melt spinning, injection molding, extrusion molding, inflation molding or blow molding, etc.

The seventh version of this invention is a polymer alloy, comprising polyphenylene sulfide resin and a polyester resin with polyethylene terephthalate as a main component, and forming a co-continuous structure with a wavelength of concentration fluctuation of 0.001 to 2 μm or a dispersed structure with a distance between particles of 0.001 to 2 μm.

The polyphenylene sulfide (PPS) used in this invention is a polymer containing the recurring units represented by the following structural formula:

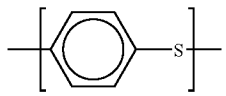

In view of heat resistance, a polymer containing 70 mol % or more, especially 90 mol % or more of the recurring units represented by the above structural formula is preferred. The PPS can contain 30 mol % or less of the recurring units represented by any of the following structural formulae, etc.

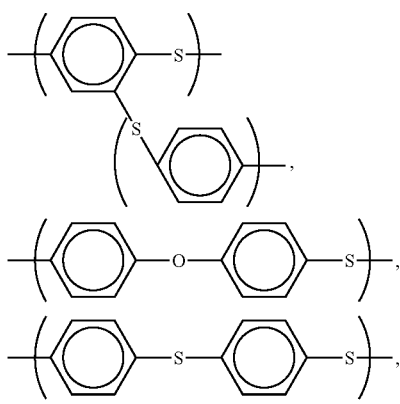

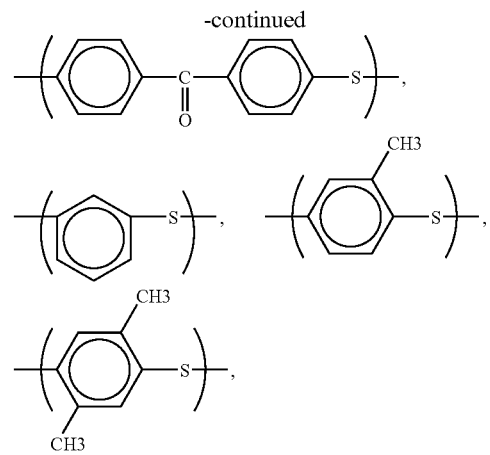

The PPS used in this invention can be manufactured, for example, by a publicly known ordinary method, such as a method described in JP45-3368B, in which a polymer with a relatively small molecular weight is obtained, or a method as described in JP52-12240B or JP61-7332A, in which a polymer with a relatively large molecular weight is obtained. In this invention, the PPS obtained as described above can be, for example, heated in air for achieving crosslinking/increasing its molecular weight, or heat-treated in an atmosphere of an inert gas such as nitrogen or under reduced pressure, or washed using an organic solvent, hot water, acid aqueous solution or the like, or activated using a functional group-containing compound such as a functional group-containing disulfide compound, as any of various treatments to be applied before use. Two or more of these treatments can of course be applied. Furthermore, differently treated two or more PPS can also be used as a mixture. Particular methods for using differently treated two or more PPS as a mixture include mixing PPS crosslinked by heating in air and non-heat-treated PPS, mixing PPS washed using an acid aqueous solution and PPS washed using an organic solvent, mixing PPS washed using an organic solvent and PPS not washed using an organic solvent, and so on.

The molecular weight of the PPS used in this invention is not especially limited, but should be adequately selected, since it relates to the conditions for inducing spinodal decomposition described later. Usually PPS of 5 to 1,000 Pa·s (320° C., shear rate 1000 sec$^{-1}$), and above all, PPS of 10 to 500 Pa·s can be preferably used.

A particular method for heating PPS for achieving crosslinking/increasing its molecular weight is, for example, heating in an atmosphere of an oxidizing gas such as air or oxygen, in an atmosphere of mixed gas consisting of any of the oxidizing gases and an inert gas such as nitrogen or argon at a predetermined temperature till a desired melt viscosity can be obtained. The heat treatment temperature is usually selected from 170 to 280° C., preferably from 200 to 270° C. The heat treatment time is usually selected from 0.5 to 100 hours, preferably 2 to 50 hours. If the heat treatment temperature and time are adequately controlled, the target viscosity level can be obtained. The heat treatment apparatus can be an ordinary hot air dryer for use under reduced pressure or having high sealing capability, or a rotary heater, or a heater with stirring blades. However, for efficient and more homogeneous treatment, it is preferred to use a rotary heater or a heater with stirring blades.

A particular method for heat-treating PPS in an atmosphere of an inert gas such as PPS or under reduced pressure is, for example, to heat-treat in an atmosphere of an inert gas such as nitrogen or under reduced pressure at a heat treatment temperature of 150 to 280° C., preferably 200 to 270° C. for heat treatment time period of 0.5 to 10 hours, preferably 2 to 50 hours. The heat treatment apparatus can be a stationary heater, a rotary heater or a heater with stirring blades, but for efficient and more homogeneous treatment, it is preferred to use a rotary heater or a heater with stirring blades.

As particular methods for washing PPS using an organic solvent, the following methods can be exemplified. The organic solvent used for washing is not especially limited if it does not act, for example, for decomposing PPS. Such organic solvents include, for example, nitrogen-containing polar solvents such as N-methylpyrrolidone, dimethylformamide and dimethylacetamide, sulfoxide/sulfone solvents such as dimethyl sulfoxide and dimethyl sulfone, ketone solvents such as acetone, methyl ethyl ketone, diethyl ketone and acetophenone, ether solvents such as dimethyl ether, dipropyl ether and tetrahydrofuran, halogen-based solvents such as chloroform, methylene chloride, trichloroethylene, ethylene dichloride, dichloroethane, tetrachloroethane and chlorobenzene, alcohol/phenol solvents such as methanol, ethanol, propanol, butanol, pentanol, ethylene glycol, propylene glycol, phenol, cresol and polyethylene glycol, aromatic hydrocarbon solvents such as benzene, toluene and xylene. Among these organic solvents, it is preferred to use N-methylpyrrolidone, acetone, dimethylformamide, chloroform, etc. Any one of these organic solvents can be used, or two or more of them can also be used as a mixture. A method for washing using an organic solvent is, for example, to soak PPS into an organic solvent, and as required, stirring or heating can also be employed. The washing temperature at which PPS is washed using an organic solvent is not especially and any desired temperature of room temperature to about 300° C. can be selected. At a higher washing temperature, the washing efficiency tends to be higher, but usually at a washing temperature of room temperature to 150° C., a sufficient effect can be obtained.

It is preferred that the PPS washed with an organic solvent is washed with cold or hot water several times to remove the remaining organic solvent.

As particular methods for washing PPS using hot water, the following methods can be exemplified. To exhibit a preferred effect of chemically modifying PPS by washing with hot water, it is preferred that the water used is distilled water or deionized water. For operation of hot water treatment, a predetermined amount of PPS is added into a predetermined amount of water, and they are heated and stirred at atmospheric pressure or in a pressure vessel. As for the ratio between PPS and water, it is preferred to use more water. Usually a bath ratio of 200 g or less of PPS per 1 liter of water is selected.

As particular methods for treating PPS using an acid, the following methods can be exemplified. For example, a method of soaking PPS into an acid or an acid aqueous solution can be employed, and as required, stirring or heating can also be used. The acid used is not especially limited, if it does not act for decomposing PPS. Such acids include aliphatic saturated monocarboxylic acids such as formic acid, acetic acid, propionic acid and butyric acid, halo-substituted aliphatic saturated carboxylic acids such as chloroacetic acid and dichloroacetic acid, aliphatic unsaturated monocarboxylic acids such as acrylic acid and crotonic acid, aromatic carboxylic acids such as benzoic acid and salicylic acid, dicarboxylic acids such as oxalic acid, malonic acid, succinic acid, phthalic acid and fumaric acid, inorganic acidic compounds such as sulfuric acid, phosphoric acid, hydrochloric acid, carbonic acid and silicic acid. Among them, acetic acid and hydrochloric acid can be more preferably used. It is preferred that the PPS treated with an acid is washed with cold or hot water several times for removing the acid, salt and the like remaining on PPS. It is preferred that the water used for washing is distilled water or deionized water, lest the preferred effect of chemically modifying PPS by the acid treatment should be impaired.

It is most preferred that the polyester resin with polyethylene terephthalate as the main component (hereinafter may be abbreviated as PET) used in this invention is polyethylene terephthalate homopolymer. However, the polyester resin can be any of those in which terephthalic acid used as an component is partially substituted by one or more of isophthalic acid, 5-sodiumsulfoisophthalic acid, 2,6-naphthalenedicarboxylic acid, diphenoxyethanedicarboxylic acid, adipic acid, sebacic acid, azelaic acid and dodecanedicarboxylic acid, or can be any of those in which ethylene glycol is partially substituted by one or more of 1,4-butanediol, propylene glycol, neopentyl glycol, hexamethylene glycol, pentamethylene glycol, 1,4-cyclohexanedimethanol, glycerol, pentaerythritol, polyethylene glycol, polytetramethylene glycol, etc. It is desirable that the copolymerization rate is kept in a range of 15 mol % or less, and it is more desirable that it is kept in a range of 5 mol % or less.

The molecular weight of the PET used in this invention is not especially limited, but it is preferred to adequately select the molecular weight, since it relates to the conditions for inducing the spinodal decomposition described later. With regard to the intrinsic viscosity as a parameter relating to the molecular weight, a PET of 0.6 or more (25° C., orthochlorophenol solution) can be used, and above all, a PET of 0.7 or more can be preferably used. It is preferred that the upper limit is 1.5 or less.

As the method for obtaining the polymer alloy of this invention, the method of using the spinodal decomposition described for the first version of this invention is preferred. Above all, the method of using the shear-induced spinodal decomposition can be preferably used, since finer structural control can be facilitated.

For inducing the spinodal decomposition, it is necessary to make two or more resins used as components miscible, and to subsequently arrive at the unstable state inside the spinodal curve. At first the method for making the two or more resins used as components miscible can be a solvent casting method or a melt blending method. A solvent casting method refers to a method in which after dissolving into a common solvent, the solution is transformed into a film or the like by means of spray drying, freeze drying, solidification in a non-solvent substance or solvent evaporation. A melt blending method refers to a method in which resins of a partially miscible system or of an immiscible system are melt blended, to be made miscible. Among them, a melt blending method that is a dry process free from the use of any solvent can be practically preferably used. For inducing the spinodal decomposition in a polymer alloy containing PPS and PET, PPS and PET are made miscible and subsequently brought to the unstable state inside the spinodal curve.

At first the method for making the two or more resins used as components miscible can be a solvent casting method or a melt blending method. A solvent casting method refers to a method in which after dissolving into a common solvent, the solution is transformed into a film or the like by means of spray drying, freeze drying, solidification in a non-solvent substance or solvent evaporation. A melt blending method refers to a method in which resins of a partially miscible system or of an immiscible system are melt blended, to be made miscible. Among them, a melt blending method that is a dry process free from the use of any solvent can be practically preferably used.

In the case where a polymer alloy of a partially miscible system is used, the resins of a partially miscible system are melt blended for being made miscible under the conditions to allow it, and cooled for inducing the spinodal decomposition. In the case where a polymer alloy of an immiscible system is used, it is possible to use the phase separation caused by the so-called shear induced spinodal decomposition as described for the first version of this invention, in which the polymer alloy is melt blended under high shear flow, for being made miscible, and decomposed in phase under no shear flow. The shear induced phase dissolution and phase decomposition of an immiscible system can be more preferably used, since the wavelength of concentration fluctuation in the early stage of spinodal decomposition can be easily shortened compared with that of a partially miscible system, as described for the first version of this invention.

In the case where PPS and PET are melt blended, if all the resins used respectively have such a molecular weight as usually used for molding into fibers, three-dimensional molded article or the like, they show the shear induced phase dissolution and phase decomposition of an immiscible system, and if they are melt blended under high shear flow, they can be made miscible. On the other hand, since the difference between PPS and PET in solubility parameter is small, if either or both of them are decreased in molecular weight, a partially miscible system is formed, and they can be made miscible under lower shear flow.

In the case of a partially miscible system, for melt blending for making miscible, an ordinary single-screw extruder or twin-screw extruder can be used, and among them, it is preferred to use a twin-screw extruder. The temperature for making miscible depends on the combination between the molecular weight of PPS and that of PET, and cannot be generally specified. However, if preliminary experiments are carried out based on the phase diagrams prepared for the cases where the molecular weights of PPS and/or PET are lowered as required for making miscible at the temperature of melt blending, the temperature can be decided. It is preferred that the melt viscosity of the PPS with a low molecular weight is 0.01 to less than 5 Pa·s, and it is preferred that the intrinsic viscosity of the PET with a low molecular weight is less than 0.6. The lower limit depends on the composition ratio of PPS and PET and cannot be generally specified. A PET with any lower value can be used, if a desired molding method can be used for molding.

For inducing the spinodal decomposition in the polymer alloy made miscible, the temperature and other conditions for arriving at the unstable state depend on the combination between the molecular weight of PPS and that of PET, and cannot be generally specified. However, they can be decided if simple preliminary experiments are carried out based on aforesaid phase diagrams.

In the case of an immiscible system, a polymer alloy consisting of PPS and PET, the molecular weights of which are kept in the aforesaid usually used ranges, can be used. For making miscible by melt blending under shear flow, an ordinary single-screw extruder or twin-screw extruder can be used. Above all, it is preferred to use a twin-screw extruder with its screws arranged to allow application of high shear flow. The temperature for making miscible, the temperature for inducing the spinodal decomposition and other conditions depend on the combination between the molecular weight of PPS and that of PET, and cannot be generally specified. However, they can be decided by carrying out simple experiments based on the phase diagrams prepared under various shearing conditions.

The temperature and other conditions for inducing the spinodal decomposition under no shear flow in the polymer alloy made miscible depend on the combination between the molecular weight of PPS and that of PET and cannot be generally specified. However, they can be decided by carrying out simple experiments based on the phase diagrams prepared under various shearing conditions. For more effectively making the structure finer by the shear induced spinodal decomposition, it is preferred to select the combination between the molecular weight of PPS and that of PET to ensure that the phase diagrams prepared under shearing conditions change more greatly.

After phase separation has been caused by the spinodal decomposition, it is only required to fix the structure when a desired wavelength of concentration fluctuation has been reached. The method for fixing the structural product achieved by the spinodal decomposition can be a method of fixing the structure(s) of either or both of the phases separated by quick cooling or the like, or a method of fixing the structure using the phenomenon that crystallization does not allow free motion. Furthermore, in the process from the intermediate stage to the late stage in which the wavelength increases, it can happen that one phase becomes discontinuous due to the influence of the composition ratio or interfacial tension, to change from the aforesaid co-continuous structure to a dispersed structure. In this case, it is only required to fix the structure when the desired distance between particles has been reached.

In the polymer alloy of this invention, it is necessary that the PPS resin and the PET resin in the resin composition are structurally controlled to ensure a co-continuous structure with the wavelength of concentration fluctuation kept in a range from 0.001 to 2 μm or a dispersed structure with the distance between particles kept in a range from 0.001 to 2 μm. For obtaining further excellent mechanical properties, it is preferred to control for ensuring a co-continuous structure with the wavelength of concentration fluctuation kept in a range from 0.001 to 1.2 μm, or a dispersed structure with the distance between particles kept in a range from 0.001 to 1.2 μm, and it is more preferred to control for ensuring a co-continuous structure with the wavelength of concentration fluctuation kept in a range from 0.001 to 1 μm, or a dispersed structure with the distance between particles kept in a range from 0.001 to 1 μm. It is further more preferred to control for ensuring a co-continuous structure with the wavelength of concentration fluctuation kept in a range from 0.001 to 0.8 μm, or a dispersed structure with the distance between particles kept in a range from 0.001 to 0.8 μm.

Furthermore, to the polymer alloy of this invention, a third components such as a copolymer, for example, a block copolymer, graft copolymer or random copolymer respectively containing PPS and PET can be preferably added, for such reasons that the free energy at the interface between the separated phases can be lowered and that the wavelength of concentration fluctuation in the co-continuous structure or the distance between particles in the dispersed structure can be easily controlled. In this case, since the third components such as a copolymer is usually distributed into the respective phases of the polymer alloy consisting of two resins contained as components excluding the third component, the polymer alloy obtained can be handled like the polymer alloy consisting of two resins contained as components.

The composition ratio of the polymer alloy of this invention is not especially limited, but it is usually preferred that the amount of PPS is 3 wt % or more per 100 wt % in total of PPS and PET. More preferred is 10 wt % or more, and furthermore preferred is 40 wt % or more. As a preferred composition ratio for effectively exhibiting the properties of PPS resin, it is preferred that the amount of PPS is in a range from 60 to 95 wt %, especially in a range from 65 to 95 wt % per 100 wt % in total of PPS and PET.

In this invention, to further improve the strength, dimensional stability, and so on, a filler can be used as required. The form of the filler can be either fibrous or non-fibrous, and a fibrous filler and a non-fibrous filler can also be used in combination. Such fillers include fibrous fillers such as glass fibers, glass milled fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers and metal fibers, and non-fibrous fillers, for example, silicates such as wollastonite, zeolite, sericite, kaolin, mica, clay, pyrophyllite, bentonite, asbestos, talc and alumina silicate, metal compounds such as alumina, silicon oxide, magnesium oxide, zirconium oxide, titanium oxide and iron oxide, carbonates such as calcium carbonate, magnesium carbonate and dolomite, hydroxides such as magnesium hydroxide, calcium hydroxide and aluminum hydroxide, glass beads, ceramic beads, boron nitride, silicon carbide, etc. They can be hollow, and two or more of these fillers can also be used together. It is preferred that these fibrous and/or non-fibrous fillers are preliminarily treated with a coupling agent such as an isocyanate-based compound, organic silane-based compound, organic titanate-based compound, organic borane-based compound or epoxy compound, since more excellent mechanical strength can be obtained.

In the case where such a filler is used, the amount is not especially limited, but it is usually preferred to use 30 to 400 parts by weight of a filler per 100 parts by weight of the PPS resin.

To the polymer alloy of this invention, ordinary additives can be added to such an extent that the effect of this invention is not impaired. The additives include a plasticizer such as a polyalkylene oxide oligomer-based compound, thioether-based compound, ester-based compound or organic phosphorus compound, crystal nucleating agent such as talc, kaolin, organic phosphorus compound or polyether ether ketone, releasing agent such as a polyolefin-based compound, silicone-based compound, long chain aliphatic ester-based compound or long chain aliphatic amide-based compound, anticorrosive, coloration preventive, antioxidant, thermal stabilizer, lubricant such as lithium stearate or aluminum stearate, ultraviolet light preventive, colorant, flame retarder, foaming agent, etc.

These additives can be mixed at any desired stage while the polymer alloy of this invention is manufactured. For example, such methods as a method of adding simultaneously when at least two resins used as components are mixed, a method of adding after two resins used as components have been melt blended, and a method of adding at first to either of the resins, melt blending and mixing the remaining resin can be used.

The polymer alloy of this invention can be molded by a desired method into fibers, film, sheet or molded article, etc. The molding method can be, for example, melt spinning, injection molding, extrusion molding, inflation molding, or blow molding, etc. Above all, it is preferred to melt-spin for use as fibers.

This invention is described below based on examples.

In the examples, the following raw materials were used.

PBT-1: Polybutylene terephthalate ("Toraycon (registered trademark)" 1100S, glass transition temperature 32° C., crystal melting temperature 220° C., produced by Toray Industries, Inc.)

PBT-2: Polybutylene terephthalate ("Toraycon (registered trademark)" 1050S, glass transition temperature 32° C., crystal melting temperature 220° C., produced by Toray Industries, Inc.)

PBT-3: Polybutylene terephthalate resin (intrinsic viscosity 1.00 (25° C., orthochlorophenol solution))

PC-1: Aromatic polycarbonate ("Iupilon (registered trademark)" S2000, glass transition temperature 151° C., produced by Mitsubishi Engineering Plastic Co., Ltd.)

PC-2: Aromatic polycarbonate ("Iupilon (registered trademark)" H4000, glass transition temperature 151° C., produced by Mitsubishi Engineering Plastic Co., Ltd.)

PC-3: Aromatic polycarbonate ("Toughlon" A1900, glass transition temperature 151° C., produced by Idemitsu Petrochemical Co., Ltd.)

AS-1: Styrene-acrylonitrile copolymer ("Toyolac (registered trademark)" 1050B, glass transition temperature 102° C., produced by Toray Industries, Inc.)

PPS-1: PPS resin (PPS resin produced by polymerization as described in the following reference example)

PET-1: Polyethylene terephthalate resin (intrinsic viscosity 0.62 (25° C., orthochlorophenol solution))

Inert particles: Wet process silica with an average particle size of 2.5 μm (secondary diameter)

Releasing agent: Ethylene glycol montanic ester (Licowax (registered trademark) E, produced by Clariant (Japan) K.K.)

E-1: Ester interchange preventive ("Adekastab" AX-71 produced by Asahi Denka Kogyo K.K.)

X-1: Styrene-containing acrylic graft copolymer ("Paraloid" EXL2615, average particle size 0.1 to 0.6 μm, produced by Kureha Chemical Industry Co., Ltd.)

REFERENCE EXAMPLE

Polymerization for Obtaining PPS Resin (PPS-1)

An autoclave with a stirrer was charged with 6.004 kg (25 moles) of sodium sulfide nonahydrate and 4.5 kg of N-methyl-2-pyrrolidone (NMP), and while nitrogen was introduced, the temperature was gradually raised to 205° C., to distil away 3.6 liters of water. Then, the reaction vessel was cooled to 180° C., and 3.719 kg (25.3 moles) of 1,4-dichlorobenzene and 3 kg of NMP were added. The reaction vessel was sealed under nitrogen and heated to 270° C., to carry out a reaction at 274° C. for 1.5 hours. After cooling, the reaction product was washed with warm water twice, to obtain a slurry. The slurry was placed in an autoclave with a stirrer together with 3 kg of ion exchange water, and the mixture was heated to 190° C., and cooled to room temperature. The reaction mixture was filtered, and the residue was washed with hot water several times. It was filtered, and the residue was dried at 80° C. for 24 hours under reduced pressure to obtain 2.48 kg of PPS resin. The PPS resin was of straight chain and had a melt viscosity of 80 Pa·s (320° C., shear rate 1000 sec$^{-1}$), a glass transition temperature of 89° C. and a crystal melting temperature of 280° C.

The melt viscosity was measured using a capillary type melt viscosity measuring instrument (CAPIROGRAPH-IC produced by Toyo Seiki Seisakusho, Ltd.) with orifice L/D=20 (inner diameter 1 mm), and the glass transition temperature and the crystal melting temperature were measured at a heating rate of 20° C./min using DSC (DSC-7 produced by Perkin-Elmer).

In the examples, the following evaluation methods were used.

(1) Evaluation of Phase Structure

A. Observation Using an Electron Microscope

A very thin section was cut out of a sample using an ultra-microtome. In this case, in the case where the sample contained a polycarbonate, the polycarbonate was dyed using an iodine dyeing method, before cutting out a very thin section. The section was magnified 100,000 magnifications under Model H-7100 Transmission Electron Microscope produced by Hitachi, Ltd., to observe the phase structure.

B. Observation Using Small-Angle X-Ray Scattering

The wavelength of concentration fluctuation of a co-continuous structure was measured using small-angle X-ray scattering. The X-ray generator was RU-200 produced by Rigaku Corporation, and CuKα radiation was used as a radiation source. A scattering photograph was taken at an output of 50 kV/150 mA, a slit diameter of 0.5 mm and a camera radius of 405 mm for an exposure time of 120 minutes using Kodak DEF-5 film. From the peak position (θm) in small-angle X-ray scattering, the wavelength of concentration fluctuation (Λm) was calculated from the following formula.

$$\Lambda m = (\lambda/2)/\sin(\theta m/2)$$

The distance between particles of a dispersed structure was also obtained similarly.

(2) Measurement of Glass Transition Point

Model RDC-220 DSC produced by Seiko Instruments Inc. was used for measuring at a heating rate of 20° C./min in a nitrogen atmosphere.

WORKING EXAMPLES 1 TO 5

Raw materials with a composition ratio shown in Table 1 were fed into a parallel plates type shear flow-applying device (CSS-430 produced by Lineekam), and molten at a kneading temperature of 250° C. Then, a shear field was applied at the shear rate shown in Table 1. Every sample was observed in the portion subjected to the shear field at the shear rate shown in Table 1, and it was confirmed that none of the samples had any structure. Each of the samples was immediately quickly cooled in icy water to fix its structure, and the phase structure of the obtained sample was observed with a transmission electron microscope. It was confirmed that none of the samples had structure of 0.001 µm or more, and that they were made miscible. So, it was found that this series was made miscible at 250° C. under the shearing condition shown in Table 1.

Next, raw materials with a composition ratio shown in Table 1 were fed into a twin-screw extruder (PCM-30 produced by Ikegai Kogyo) set at an extrusion temperature of 250° C., and the gut discharged from the die was immediately quickly cooled in icy water, to obtain a gut with its structure fixed. All the guts were transparent. The phase structures of the guts were observed with a transmission electron microscope, and it was confirmed that none of the samples had structure of 0.001 µm, and that they were made miscible. So, it was found that this series was made miscible under the shear flow in an extruder set at an extrusion temperature of 250° C. The glass transition temperatures of 100 mg samples cut out of the guts were measured using DSC, and the results are shown in Table 1.

This series was of a system with an LCST type phase diagram, and had the miscible region expanded under the shear flow of an extruder.

Furthermore, a 100 µm thick section was cut out of each of the guts, and heat-treated at the temperature shown in Table 1, and during the heat treatment, the structure-forming process was traced using small-angle X-ray scattering. In every sample, one minute after start of heat treatment, a peak appeared. Furthermore, when the peak was observed, a tendency of strength increase was observed without any change in the peak position. The stage in which the strength increases without any change in the peak position in small-angle X-ray scattering corresponds to the initial stage of spinodal decomposition. Table 1 shows the wavelengths of concentration fluctuation (Λm) calculated from the peak positions (θm).

The sections subject to the above-mentioned heat treatment process were partially quickly cooled in icy water to fix their structures, and the phase structures were observed with a transmission electron microscope. Every sample was observed to have a co-continuous structure.

FIG. 1 is a transmission electron microscope photograph showing the structure obtained in the early stage of spinodal decomposition of Working Example 2. In the photograph, the black portions indicate the phase with the polycarbonate as a main component, and white portions indicate the phase with polybutylene terephthalate as a main component.

The sections measured using the small-angle X-ray scattering had structures formed in the early stage, and subsequently continuously heat-treated at the respective temperatures for 10 minutes in total, for forming structures. With the samples, the wavelengths of concentration fluctuation were observed with small-angle X-ray scattering as described above, and their phase structures were observed on transmission electron microscope photographs. The results are shown in Table 1.

Figure 2:
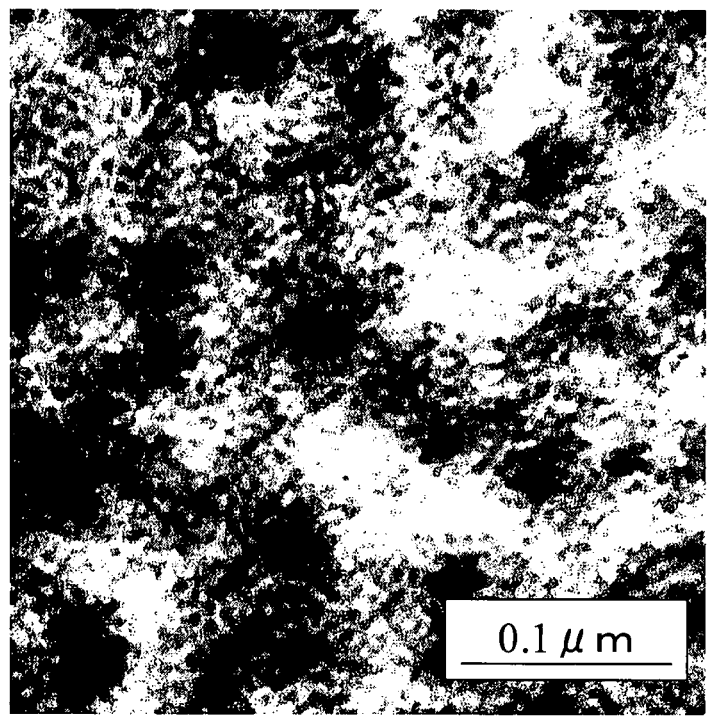
FIG. 2 is a transmission electron microscope photograph showing a structure obtained by coarsening the co-continuous phase formed in the early stage of spinodal decomposition of Working Example 2.

FIG. 2 shows the transmission electron microscope photograph of the structure obtained after continuing heat treatment for 10 minutes in Working Example 2. In the photograph, black portions indicate the phase with the polycarbonate as a main component, and white portions show the phase with polybutylene terephthalate as a main component.

The guts with their structures fixed by quick cooling were hot-pressed into sheets (0.2 mm thick). The hot pressing conditions are shown in Table 1. From the obtained sheets, 100 µm thick sections were cut out, and as described above, the wavelengths of concentration fluctuation or the distances between particles were obtained using small-angle X-ray scattering, and phase structures were observed on transmission electron microscope photographs. The results are shown in Table 1. Also from the results, it can be seen that the heat treatment by means of a hot press also allowed the same structures to be formed as those in the samples cut out of the guts. From the sheets, 50 mm long, 10 mm wide and 0.2 mm thick samples were cut out, and their tensile strengths and tensile elongations were measured at an inter-chuck distance of 20 mm and a tensile speed of 10 mm/min. Furthermore, specimens were taken from the sheets using a die cutting press, and tensile impact strengths were measured according to ASTM D 1822. The results of measurement are shown in Table 1.

Furthermore, each of the guts with their structures fixed by quick cooling was pelletized into pellets using a strand cutter. The obtained pellets were used to obtain a sheet by an extrusion method. The pellets were fed into a single-screw extruder (40 mm diameter) set at an extrusion temperature of 250° C. and having a T die at the tip, with the retention time set at 10 minutes, to produce a sheet. For producing the sheet, a casting drum made of hard chromium and having a mirror finished surface with the temperature kept at 50° C. was placed below the T die. The resin composition discharged from the mouthpiece of the T die was cast onto the casting drum, and passed over a second drum kept at 50° C., and further between rolls set at 5 m/min for keeping the take-up speed constant, being taken up by a take-up roll, to obtain a sheet. The thickness of the obtained sheet was 0.1 mm. Furthermore, it was transparent. The phase structure of the sheet was observed using a transmission electron microscope. It was confirmed that every sample had a co-continuous structure. Furthermore, from the obtained sheet, a 10 mg sample was cut out, and its glass transition temperature and heating crystallization temperature were measured using DSC. The results are shown in Table 1. From the results of measurement with DSC, it was found that each sheet obtained had two glass transition temperatures. This suggests that phase separation occurred during the melting time in the extruder. To confirm it, further samples were cut out from the obtained sheets and the structure-forming processes during heat treatment at 250° C. were traced using small-angle X-ray scattering. With every sample, a peak existed, and when the peak was observed, a tendency of strength increase was observed for 1 minute thereafter without any change in the peak position. The stage in which the strength increased without any change in the peak position in the small-angle X-ray scattering corresponds to the coarsening in the early stage of spinodal decomposition. Table 1 shows the wavelengths of concentration fluctuation in the early stage calculated as described above. From the above results, it can be considered that the spinodal decomposition occurred again during the melting time in the extruder, and that, as a result, a co-continuous structure could be observed in each of the obtained sheets.

From each of the obtained sheets, a 100 mm square sample was cut out, fastened using clips on its four sides, preheated at 90° C. for 60 seconds, and stretched simultaneously biaxially at a stretching speed of 2000%/min at a stretching ratio of 3 times in an oven kept at 90° C. With each of the stretched samples, as described before, the wavelength of concentration fluctuation was observed using small-angle X-ray scattering, and the phase structure was observed on a transmission electron microscope photograph. The results are shown in Table 1. In each of the stretched samples, the wavelength of concentration fluctuation increased compared with that before stretching, and it can be considered that the heat treatment during stretching caused coarsening. Furthermore, from each of the stretched sheets, a 50 mm long, 10 mm wide and 0.03 mm thick sample was cut out, and its tensile strength and tensile elongation were measured at an inter-chuck distance of 20 mm at a tensile speed of 10 mm/min, and the results are shown in Table 1.

Comparative Example 1

Raw materials were melt blended, discharged from a die, and immediately quickly cooled in icy water, to obtain a gut with its structure fixed as described for Working Example 2, except that the extrusion temperature was set at 280° C. The gut was cloudy. When, the gut was magnified 1000 magnifications under a transmission electron microscope for observation, heterogeneously dispersed structure of 0.5 μm and more were observed. So, it can be seen that the system was not made miscible under the shear flow in the extruder with an extrusion temperature of 280° C. Also for this sample, the mechanical properties were measured and the phase structure was observed as described for Working Example 2, and the results are shown in Table 1.

Comparative Example 2

A sample was obtained as described for Working Example 2, except that the heat treatment was carried out at a temperature of 220° C. for 10 minutes. The mechanical properties of the sample were measured, and its phase structure was observed. The results are shown in Table 1. However, the wavelength of concentration fluctuation of this sample was measured using a small-angle light scattering device. In the case where the wavelength of concentration fluctuation in the early stage does not become sufficiently small because of low heat treatment temperature as in this example, if coarsening is carried out to obtain a sufficient difference between the concentrations of both the components, it becomes difficult to control the wavelength of concentration fluctuation within the scope of this invention. Furthermore, as in this example, if the wavelength of concentration fluctuation does not conform to this invention, a sample with poor mechanical properties only can be obtained.

Comparative Example 3

A sample was obtained as described for Working Example 4, except that quick cooling and heat treatment were not carried out after the structure was formed in the early stage of spinodal decomposition. The mechanical properties of the sample were measured, and the phase structure was observed. The results are shown in Table 1.

As can be seen from the results of Working Examples 1 to 5 and Comparative Examples 1 to 3, the polymer alloys with a specific structure of this invention have excellent strength and toughness.

TABLE 1

|  |  |  | Working Example 1 | Working Example 2 | Working Example 3 | Working Example 4 |
|---|---|---|---|---|---|---|
| Composition | PC-1 | (wt %) | 70 | 50 | 30 | 50 |
|  | PBT-1 | (wt %) | 30 | 50 | 70 | 50 |
| Kneading condition | Shearing rate | (sec$^{-1}$) | 1000 | 1000 | 1000 | 1000 |
|  | Miscibility |  | Miscible | Miscible | Miscible | Miscible |
| Extruded gut | Miscibility |  | Miscible | Miscible | Miscible | Miscible |
|  | Glass transition temperature | (° C.) | 85 (single) | 78 (single) | 69 (single) | 77 (single) |
| Extruded and heat-treated gut | Heat treatment conditions |  | 250° C. × 1 min | 250° C. × 1 min | 250° C. × 1 min | 270° C. × 1 min |
|  | Initial structure |  | Co-continuous structure | Co-continuous structure | Co-continuous structure | Co-continuous structure |

TABLE 1-continued

|  |  |  |  |  |  |  |
|---|---|---|---|---|---|---|
|  | Wavelength of concentration fluctuation | (μm) | 0.01 | 0.01 | 0.01 | 0.005 |
|  | Heat treatment conditions |  | 250° C. × 10 min | 250° C. × 10 min | 250° C. × 10 min | 270° C. × 10 min |
|  | Polymer alloy structure |  | Dispersed structure | Co-continuous structure | Dispersed structure | Co-continuous structure |
|  | Wavelength of concentration fluctuation or distance between particles | (μm) | 0.13 | 0.11 | 0.12 | 0.04 |
| Pressed and heat-treated sheet | Heat treatment conditions |  | 250° C. × 10 min | 250° C. × 10 min | 250° C. × 10 min | 270° C. × 10 min |
|  | Polymer alloy structure |  | Dispersed structure | Co-continuous structure | Dispersed structure | Co-continuous structure |
|  | Wavelength of concentration fluctuation or distance between particles | (μm) | 0.14 | 0.12 | 0.12 | 0.05 |
|  | Tensile strength | (MPa) | 71 | 66 | 62 | 73 |
|  | Tensile elongation | (%) | 320 | 270 | 240 | 310 |
|  | Tensile impact strength | (J/cm$^2$) | 122 | 113 | 103 | 127 |
| Extruded sheet | Initial structure |  | Co-continuous structure | Co-continuous structure | Co-continuous structure | — |
|  | Wavelength of concentration fluctuation | (μm) | 0.008 | 0.008 | 0.008 | — |
|  | Glass transition temperature | (° C.) | 69, 101 | 61, 96 | 53, 85 | — |
|  | Heating crystallization temperature | (° C.) | 122 | 112 | 105 | — |
| Stretched sheet | Polymer alloy structure |  | Co-continuous structure | Co-continuous structure | Co-continuous structure | — |
|  | Wavelength of concentration fluctuation or distance between particles | (μm) | 0.07 | 0.08 | 0.08 | — |
|  | Tensile strength | (MPa) | 95 | 90 | 86 | — |
|  | Tensile elongation | (%) | 290 | 350 | 410 | — |

|  |  |  | Working Example 5 | Comparative Example 1 | Comparative Example 2 | Comparative Example 3 |
|---|---|---|---|---|---|---|
| Composition | PC-1 | (wt %) | 50 | 50 | 50 | 50 |
|  | PBT-1 | (wt %) | 50 | 50 | 50 | 50 |
| Kneading condition | Shearing rate | (sec$^{-1}$) | 1000 | — | — | — |
|  | Miscibility |  | Miscible | — | — | — |
| Extruded gut | Miscibility |  | Miscible | Immiscible | Miscible | Miscible |
|  | Glass transition temperature | (° C.) | 77 (single) | 32, 151 | 77 (single) | 77 (single) |
| Extruded and heat-treated gut | Heat treatment conditions |  | 230° C. × 1 min | 250° C. × 1 min | 220° C. × 1 min | 270° C. × 1 min |
|  | Initial structure |  | Co-continuous structure | Dispersed structure | Co-continuous structure | Co-continuous structure |
|  | Wavelength of concentration fluctuation | (μm) | 0.07 | — | 0.5 | 0.005 |
|  | Heat treatment conditions |  | 230° C. × 10 min | 250° C. × 10 min | 220° C. × 10 min | — |
|  | Polymer alloy structure |  | Co-continuous structure | Dispersed structure | Co-continuous structure |  |
|  | Wavelength of concentration fluctuation or distance between particles | (μm) | 0.81 | — | 2.1 |  |
| Pressed and heat-treated sheet | Heat treatment conditions |  | 230° C. × 10 min | 250° C. × 10 min | 220° C. × 10 min | 270° C. × 1 min |
|  | Polymer alloy structure |  | Co-continuous structure | Dispersed structure | Co-continuous structure | Co-continuous structure |
|  | Wavelength of concentration fluctuation or distance between particles | (μm) | 0.8 | — | 2.1 | 0.005 |
|  | Tensile strength | (MPa) | 59 | 41 | 49 | 43 |
|  | Tensile elongation | (%) | 210 | 45 | 77 | 60 |
|  | Tensile impact strength | (J/cm$^2$) | 95 | 15 | 38 | 45 |

TABLE 1-continued

| | | | | | | |
|---|---|---|---|---|---|---|
| Extruded sheet | Initial structure | | — | Dispersed structure | — | — |
| | Wavelength of concentration fluctuation | (μm) | — | — | — | — |
| | Glass transition temperature | (° C.) | — | 32, 151 | — | — |
| | Heating crystallization temperature | (° C.) | — | Not detected | — | — |
| Stretched sheet | Polymer alloy structure | | — | Dispersed structure | — | — |
| | Wavelength of concentration fluctuation or distance between particles | (μm) | — | — | — | — |
| | Tensile strength | (MPa) | — | 75 | — | — |
| | Tensile elongation | (%) | — | 130 | — | — |

WORKING EXAMPLES 6 AND 7

Raw materials with a composition ratio shown in Table 2 were fed into a parallel plates type shear flow-applying device (CSS-430 produced by Lineekam), and molten at a kneading temperature of 240° C. Then, a shear field was applied at the shear rate shown in Table 2. Every sample was observed in the portion subjected to the shear field at the shear rate shown in Table 2, and it was confirmed that none of the samples had any structure. Each sample was immediately quickly cooled in icy water, to obtain a sample with its structure fixed. The phase structure of the obtained sample was observed with a transmission electron microscope. It was confirmed that none of the samples had structure of 0.001 μm or more, and that they were made miscible. So, it was found that this series was of a system that could be made miscible at 240° C. under the shearing condition shown in Table 2.

Raw materials with a composition ratio shown in Table 2 were fed into a twin-screw extruder (PCM-30 produced by Ikegai Kogyo) set at an extrusion temperature of 240° C., and the gut discharged from the die was immediately quickly cooled in icy water, to fix its structure. Every gut was transparent. The phase structure of the gut was observed with a transmission electron microscope, and it was confirmed that none of the samples had structure of 0.001 μm or more, and that they were made miscible. So, it can be seen that this series could be made miscible under the shear flow in an extruder set at an extrusion temperature of 240° C.

This series was of a system with an LCST type phase diagram, and had the miscible region expanded under the shear flow of an extruder.

Furthermore, a 100 μm thick section was cut out of each of the guts and heat-treated at the conditions shown in Table 2, and during the heat treatment, the structure-forming process was traced using small-angle X-ray scattering. In every sample, one minute after start of heat treatment, a peak appeared. Furthermore, when the peak was observed, a tendency of strength increase was observed without any change in the peak position. The stage in which the strength increases without any change in the peak position in small-angle X-ray scattering corresponds to the initial stage of spinodal decomposition. The phase structures were observed as described for Working Example 1, and the results are shown in Table 2.

The sections measured using small-angle X-ray scattering were continuously heat-treated for 10 minutes in total as described for Working Example 1, except that the temperature was changed as shown in Table 2, and the phase structures were observed. The results are shown in Table 2.

Furthermore, pressed sheets were produced as described for Working Example 1, except that the temperature was changed as shown in Table 2, and the phase structures were observed. The results are shown in Table 1. From the results, it can be seen that even if a hot press is used for heat treatment, a structure could be formed as in the samples cut out of the guts.

Subsequently, from the sheets, 85 mm long, 20 mm wide and 0.8 mm thick strip samples were cut out. Each specimen was held at one end portion of 20 mm and fastened to be horizontal like a cantilever. The specimens were placed in an oven of 100, 110, 120, 130, 140, 150 or 160° C. for 60 minutes, and for each specimen, the vertical distance of the tip opposite to the held portion, hanging down by its own weight was measured. The relation between the hanging-down vertical distance at each temperature and the temperature was plotted, and the temperature intersecting with a hanging-down vertical distance of 3 mm was identified as the heat resistance temperature. The value is shown in Table 2.

Comparative Example 4

Raw materials were melt blended, discharged from a die, and immediately quickly cooled in icy water, to obtain a gut with its structure fixed as described for Working Example 6, except that the extrusion temperature was set at 290° C. The gut was cloudy. The phase structure of the gut was observed under a transmission electron microscope, and heterogeneously dispersed structure of 0.5 μm and more were observed. So, it can be seen that this sample was of a system not made miscible under the shear flow in an extruder with an extrusion temperature of 290° C. Also for this sample, the heat resistance was measured as described for Working Example 6, and the phase structure was observed. The results are shown in Table 2.

From the results of Working Examples 6 and 7 and Comparative Example 4, the polymer alloys with a specific structure have excellent heat resistance.

TABLE 2

|  |  |  | Working Example 6 | Working Example 7 | Comparative Example 4 |
|---|---|---|---|---|---|
|  | PC-1 | (wt %) | 50 | 50 | 50 |
|  | AS-1 | (wt %) | 50 | 50 | 50 |
| Kneading condition | Shearing rate | (sec−1) | 1000 | 1000 | — |
|  | Miscibility |  | Miscible | Miscible | — |
| Extruded gut | Miscibility |  | Miscible | Miscible | Immiscible |
| Extruded and heat-treated gut | Heat treatment conditions |  | 240° C. × 1 min | 270° C. × 1 min | 240° C. × 1 min |
|  | Initial structure |  | Co-continuous structure | Co-continuous structure | Dispersed structure |
|  | Wavelength of concentration fluctuation | (μm) | 0.01 | 0.08 | — |
|  | Heat treatment conditions |  | 240° C. × 10 min | 270° C. × 10 min | 240° C. × 10 min |
|  | Polymer alloy structure |  | Co-continuous structure | Dispersed structure | Dispersed structure |
|  | Wavelength of concentration fluctuation or distance between particles | (μm) | 0.12 | 0.78 | — |
| Heat-treated sheet | Heat treatment conditions |  | 240° C. × 10 min | 270° C. × 10 min | 240° C. × 10 min |
|  | Polymer alloy structure |  | Co-continuous structure | Dispersed structure | Dispersed structure |
|  | Wavelength of concentration fluctuation or distance between particles | (μm) | 0.13 | 0.79 | — |
|  | Heat resistance temperature | (° C.) | 141 | 133 | 115 |

As described above, the polymer alloy of this invention has such properties as excellent strength and toughness or excellent heat resistance depending on the resins used in combination, and can be usefully used as a structural material having such properties. The polymer alloy of this invention also has an excellent property of regularity, and can also be usefully used as a functional material based on the regularity.

In the following Working Examples 8 to 18 and Comparative Examples 5 to 10, the following evaluation methods were used.

(1) Manufacture of Specimens for Evaluation

Obtained pellets were injection-molded using an injection molding machine (PS-60E9DSE) produced by Nissei Plastic Industrial Co., Ltd. set at 240° C., 250° C., 260° C. and 260° C. from the hopper bottom toward the tip, at a mold temperature of 80° C. in molding cycles consisting of 10 seconds of follow-up pressure application and 30 seconds of cooling, to produce ⅛" thick ASTM No. 1 dumbbell specimens.

(2) Tensile Test

A ⅛" thick ASTM No. 1 dumbbell specimen was measured using UTA-2.5T Tensile Tester produced by Orientech according to ASTM D 638 at a gauge length of 114 mm at a strain rate of 10 mm/min.

WORKING EXAMPLES 8 TO 12

Raw materials with a composition ratio shown in Table 3 were fed into a twin-screw extruder set at an extrusion temperature of 260° C., with its screws arranged to have two kneading zones and with the screw rotated speed set at 300 rpm. The gut discharged from the die was passed through a cooling bath filled with water kept at 10° C., taking 15 seconds, for being quickly cooled to fix the structure. The gut was pelletized into pellets using a strand cutter. The retention time in the die was 5 seconds. All the pellets of the respective working examples were transparent. The phase structures of the pellets were observed using a transmission electron microscope, and it was confirmed that none of the samples had structure of 0.001 μm or more, and that they were made miscible.

The obtained pellets were molded into ⅛" ASTM No. 1 dumbbell specimens according to the above-mentioned manufacturing method. For Working Example 12, as shown in Table 3, a part of the releasing agent was externally added to the pellets for subsequent molding. The ASTM No. 1 dumbbells were used to carry out tensile tests according to ASTM D 638. The results are shown in Table 3. Furthermore, cooling time only was shortened during molding, and the molded articles were taken out for testing. The shortest cooling time after which the molded article could be taken out without deformation was obtained, and the result is shown in Table 3. If the shortest cooling time is shorter, productivity is higher since the molding cycle time can be shortened.

From the molded articles produced under the aforesaid injection molding conditions, 100 μm thick sections were cut out, and their phase structures were observed on transmission electron microscope photographs as described for the pellets. In the electron microscope photographs, co-continuous structures in which a polycarbonate phase dyed black and a white polybutylene terephthalate phase formed continuous phases respectively were observed.

The wavelengths of concentration fluctuation in the co-continuous structures were measured using small-angle X-ray scattering.

WORKING EXAMPLES 13 TO 15

Melt blending was carried out to obtain pellets as described for Working Examples 8 to 10, except that a die with a large inner volume was used. The retention time in the die was 20 seconds. In the observation made using a transmission electron microscope as described for Working Examples 8 to 10, fine co-continuous structures were observed. The wavelengths of concentration fluctuation obtained using small-angle X-ray scattering are shown in Table 3. The molded articles were evaluated as described for Working Examples 8 to 10, and the results are shown in Table 3.

TABLE 3

|  |  |  | Working Example 8 | Working Example 9 | Working Example 10 | Working Example 11 |
|---|---|---|---|---|---|---|
| Composition | PBT-2 | parts by weight | 75 | 55 | 25 | 55 |
|  | PC-2 | parts by weight | 25 | 45 | 75 | 45 |
|  | Releasing agent (internally added) | parts by weight | — | — | — | 0.2 |
|  | Releasing agent (externally added) | parts by weight | — | — | — | — |
| Kneading conditions | Temperature | ° C. | 260 | 260 | 260 | 260 |
|  | Screw speed | rpm | 300 | 300 | 300 | 300 |
|  | Dwell time in die | sec | 5 | 5 | 5 | 5 |
|  | Cooling bath temperature | ° C. | 10 | 10 | 10 | 10 |
| Pellets | Structure |  | Miscible | Miscible | Miscible | Miscible |
|  | Wavelength of concentration fluctuation | (μm) | — | — | — | — |
| Molded article | Molding method |  | Injection molding | Injection molding | Injection molding | Injection molding |
|  | Structure |  | Co-continuous | Co-continuous | Co-continuous | Co-continuous |
|  | Wavelength of concentration fluctuation | (μm) | 0.01 | 0.01 | 0.01 | 0.01 |
|  | Tensile strength | MPa | 73 | 81 | 77 | 82 |
|  | Tensile elongation | % | More than 200 | More than 200 | More than 200 | More than 200 |
|  | Shortest cooling time | sec | 13 | 15 | 20 | 10 |

|  |  |  | Working Example 12 | Working Example 13 | Working Example 14 | Working Example 15 |
|---|---|---|---|---|---|---|
| Composition | PBT-2 | parts by weight | 55 | 75 | 55 | 25 |
|  | PC-2 | parts by weight | 45 | 25 | 45 | 75 |
|  | Releasing agent (internally added) | parts by weight | 0.2 | — | — | — |
|  | Releasing agent (externally added) | parts by weight | 0.2 | — | — | — |
| Kneading conditions | Temperature | ° C. | 260 | 260 | 260 | 260 |
|  | Screw speed | rpm | 300 | 300 | 300 | 300 |
|  | Dwell time in die | sec | 5 | 20 | 20 | 20 |
|  | Cooling bath temperature | ° C. | 10 | 10 | 10 | 10 |
| Pellets | Structure |  | Miscible | Co-continuous | Co-continuous | Co-continuous |
|  | Wavelength of concentration fluctuation | μm | — | 0.008 | 0.005 | 0.008 |
| Molded article | Molding method |  | Injection molding | Injection molding | Injection molding | Injection molding |
|  | Structure |  | Co-continuous | Co-continuous | Co-continuous | Co-continuous |
|  | Wavelength of concentration fluctuation | μm | 0.01 | 0.12 | 0.08 | 0.11 |
|  | Tensile strength | MPa | 82 | 65 | 76 | 72 |
|  | Tensile elongation | % | More than 200 | More than 200 | More than 200 | More than 200 |
|  | Shortest cooling time | sec | 5 | 13 | 16 | 20 |

Comparative Examples 5 AND 6

Melt blending was carried out to obtain pellets as described for Working Examples 8 to 11, except that the die used had a further larger internal volume, that the screw rotated speed was 100 rpm, and that the temperature of the cooling bath was 40° C. The retention time in the die was 120 seconds. The obtained pellets were opaque, and in the observation made using a microscope as described for Working Examples 8 to 11, a dispersed structure or a co-continuous structure was observed. Since the wavelengths of concentration fluctuation were longer than those of Working Examples 8 to 11, they were obtained on electron microscope photographs. In the case where a dispersed structure was shown, the distance between particles is shown instead of the wavelength of concentration fluctuation. Furthermore, as described for Working Examples 8 to 11, the molded articles were evaluated, and the results are shown in Table 4.

TABLE 4

|  |  |  | Comparative Example 5 | Comparative Example 6 |
|---|---|---|---|---|
| Composition | PBT-2 | parts by weight | 75 | 25 |
|  | PC-2 | parts by weight | 25 | 75 |
|  | Releasing agent | parts by weight | — | — |
| Kneading conditions | Temperature | ° C. | 260 | 260 |
|  | Screw speed | rpm | 100 | 100 |
|  | Dwell time in die | sec | 120 | 120 |
|  | Cooling bath temperature | ° C. | 40 | 40 |
| Pellets | Structure |  | Dispersed | Dispersed |
|  | Wavelength of concentration fluctuation or distance between particles | μm | 1.1 | 0.9 |
| Molded article | Molding method |  | Injection molding | Injection molding |
|  | Structure |  | Dispersed | Dispersed |
|  | Wavelength of concentration fluctuation or distance between particles | μm | 1.5 | 1.1 |
|  | Tensile strength | MPa | 45 | 48 |
|  | Tensile elongation | % | 20 | 30 |
|  | Shortest molding cycle | sec | 20 | 30 |

WORKING EXAMPLES 16 TO 18

Raw materials with a composition ratio as shown in Table 5 were melt blended to obtain pellets as described for Working Examples 8 to 10. The obtained pellets were fed into a single-screw extruder (40 mm diameter) set at an extrusion temperature of 250° C. and having a T die at the tip, with the retention time set at 10 minutes, to produce a film. For producing the film, a casting drum made of hard chromium and having a mirror finished surface with the temperature kept at 50° C. was placed below the T die. The resin composition discharged from the mouthpiece of the T die was cast onto the casting drum, and passed over a second drum kept at 50° C., and further between rolls set at 5 m/min for keeping the take-up speed constant, being taken up by a take-up roll, to obtain a film. The thickness of the obtained film was 0.1 mm. Furthermore, it was transparent. The phase structure of the film was observed using a transmission electron microscope, and it was confirmed that every sample had a co-continuous structure. Furthermore, the wavelength of concentration fluctuation was measured using small-angle X-ray scattering. During film production, when the film was taken up using the take-up roll, the film was sometimes wrinkled. The take-up wrinkling frequency was recorded. The wrinkling frequency per hour is shown in Table 5. If the wrinkling frequency is smaller, the pellets allow more stable molding into a film and can be considered to be more excellent in productivity.

From each of the obtained films, a 100 mm square sample was cut out, fastened using clips on its four sides, preheated at 90° C. for 60 seconds, and stretched simultaneously biaxially at a stretching speed of 2000%/min at a stretching ratio of 3 times in an oven kept at 90° C. Also for each of the stretched samples, as described before, the wavelength of concentration fluctuation was observed using small-angle X-ray scattering, and the phase structure was observed on a transmission electron microscope photograph. The results are shown in Table 5. In each of the stretched samples, the wavelength of concentration fluctuation increased compared with that before stretching, and it can be considered that the heat treatment during stretching caused coarsening. Furthermore, from each of the stretched sheets, a 50 mm long, 10 mm wide and 0.03 mm thick sample was cut out, and its tensile strength and tensile elongation were measured at an inter-chuck distance of 20 mm at a tensile speed of 10 mm/min, and the results are shown in Table 5.

TABLE 5

|  |  |  | Working Example 16 | Working Example 17 | Working Example 18 | Comparative Example 7 | Comparative Example 8 |
|---|---|---|---|---|---|---|---|
| Composition | PBT-2 | parts by weight | 45 | 45 | 45 | 45 | 45 |
|  | PC-2 | parts by weight | 55 | 55 | 55 | 55 | 55 |
|  | Inactive particles | parts by weight | — | 1 | 2 | — | 2 |
| Kneading conditions | Temperature | ° C. | 260 | 260 | 260 | 260 | 260 |
|  | Screw speed | rpm | 300 | 300 | 300 | 100 | 100 |
|  | Dwell time in die | sec | 5 | 5 | 5 | 120 | 120 |
|  | Cooling bath temperature | ° C. | 10 | 10 | 10 | 40 | 40 |
| Pellets | Structure |  | Miscible | Miscible | Miscible | Co-continuous | Co-continuous |
|  | Wavelength of concentration fluctuation | μm | — | — | — | 0.5 | 0.5 |

TABLE 5-continued

| | | Working Example 16 | Working Example 17 | Working Example 18 | Comparative Example 7 | Comparative Example 8 |
|---|---|---|---|---|---|---|
| Film | Structure | Co-continuous | Co-continuous | Co-continuous | Dispersed | Dispersed |
| | Wavelength of concentration fluctuation or distance between particles | 0.003 | 0.003 | 0.003 | 1.5 | 1.5 |
| | Take-up wrinkling frequency times/h | 10 | 1 | Less than 0.5 | 30 | 20 |
| Stretched film | Structure | Co-continuous | Co-continuous | Co-continuous | Stretching not allowed | Stretching not allowed |
| | Wavelength of concentration fluctuation μm | 0.02 | 0.02 | 0.02 | | |
| | Tensile strength MPa | 100 | 100 | 100 | | |
| | Tensile elongation % | 200 | 200 | 180 | | |

Comparative Examples 7 AND 8

Raw materials shown in Table 5 were melt blended under the same kneading conditions as described for Comparative Example 5, to obtain pellets. The obtained pellets were opaque, and as a result of observation with an electron microscope, it was found that they had a co-continuous structure with a wavelength of concentration fluctuation of 0.5 μm. The pellets were molded into films by the same method as described for Working Examples 16 to 18. The obtained films were opaque, and as a result of observation with an electron microscope, they were found to have a dispersed structure with a distance between particles of 1.5 μm. It was attempted to simultaneously biaxially stretch the obtained films by the same method as described for Working Examples 16 to 18, but the films were broken and did not allow stretching.

From the results of Working Examples 8 to 18 and Comparative Examples 5 to 8, it can be seen that if the polymer alloy pellets of this invention are used, they can be transformed into injection-molded articles and films with excellent mechanical properties at high productivity. The polymer alloy pellets of this invention can usefully used as a structural material based on these properties.

WORKING EXAMPLES 19 TO 23

Raw materials with a composition ratio as shown in Table 6 were fed into a twin-screw extruder (PCM-30 produced by Ikegai Kogyo) set at an extrusion temperature of 250° C., having two kneading zones and revolved at a high screw rotated speed of 300 rpm. The gut discharged from the die was immediately quickly cooled in icy water to fix its structure. All the guts were transparent. The phase structures of the guts were observed with a transmission electron microscope, and it was confirmed that none of the samples had structure of 0.001 μm or more, and that they were made miscible. From the result, it can be seen that this series could be made miscible under the shear flow of an extruder set at an extrusion temperature of 250° C.

This series was of a system with an LCST type phase diagram, and had the miscible region expanded under the shear flow of an extruder.

Furthermore, each of the guts made miscible was pelletized into pellets using a strand cutter. The pellets were fed into a single-screw extruder (30 mm diameter) set at an extrusion temperature of 250° C. and having a T die at the tip, to produce a film. For producing the film, a casting drum made of hard chromium and having a mirror finished surface with the temperature kept at 20° C. was placed right under (3 cm) the T die. The resin composition discharged from the mouthpiece of the T die was cast onto the casting drum, and static electricity of 8 kV was applied to bring the film into contact with the casting drum, for quickly cooling it, to fix the structure. Furthermore, the film was passed between rolls set at 5 m/min to keep the take-up speed constant, and taken up using a take-up roll, to obtain a film. The thickness of the obtained film was 0.1 mm. The obtained film was transparent. The phase structure of the film was observed with a transmission electron microscope. It was confirmed that every sample had a co-continuous structure or a dispersed structure. From the obtained films, further samples were cut out for measurement using small-angle X-ray scattering. With every sample, a peak was observed. Table 6 shows the wavelengths of concentration fluctuation (Λm) calculated from the peak positions (θm).

From the above results, it can be considered that when a film is formed, a miscible state is kept even under the shear flow in a single-screw extruder, that after discharge from a T die, the spinodal decomposition under no shear flow causes phase separation, and that the subsequent quick cooling causes the structure to be fixed.

From the films, 50 mm long, 10 mm wide and 0.1 mm thick samples were cut out, and at an inter-chuck distance of 20 mm and a tensile speed of 10 mm/min, the tensile strengths and tensile elongations were measured. The results are shown in Table 6.

From each of the obtained films, a 100 mm square sample was cut out, fastened using clips on its four sides, preheated at 90° C. for 60 seconds, and simultaneously biaxially stretched at a stretching speed of 2000%/min at a stretching ratio of 2 times or 4 times in an oven kept at 90° C. Each of the stretched films was fastened on its four sides in an aluminum frame and passed through an oven kept at 180° C. taking 15 seconds, for heat treatment, to stabilize the phase structure of the stretched film. Also for each of the stretched samples, as described before, the wavelength of concentration fluctuation was measured using small-angle X-ray scattering, and the phase structure was obtained on a transmission electron microscope photograph. The results are shown in Table 6. In each of the stretched samples, the wavelength of concentration fluctuation was longer than that before stretching, and it can be considered that coarsening occurred during stretching. Furthermore, from each of the films stretched to 2 times, a 50 mm long, 10 mm wide and 0.03 mm sample was cut out, and from each of the films stretched to 4 times, a 50 mm long, 10 mm wide and 0.01 mm thick sample was cut out. The tensile strength and tensile elongation of each sample was measured at an inter-chuck distance of 20 mm and at a tensile speed of 10 mm/min. The results are shown in Table 6.

Comparative Example 9

Melt blending was carried out as described for Working Example 21, except that a single-screw extruder (40 mm diameter) having a full-flighted screw was used at a screw rotated speed of 50 rpm. The gut discharged from the die was immediately quickly cooled in icy water, to obtain a gut with its structure fixed. The gut was cloudy. The phase structure of the gut was observed with a transmission electron microscope, and heterogeneously dispersed structure of 0.5 μm and more were observed. From the result, it can be seen that the gut was of a system not made miscible under the shear flow in the extruder. Also from this system, a film was produced as described for Working Example 21, and the mechanical properties were measured. The results are shown in Table 6. Furthermore, from this film, a 100 mm square sample was cut out, fastened using clips on its four sides, preheated at 90° C. for 60 seconds, and simultaneously biaxially stretched at a stretching speed of 2000%/min at a stretching ratio or 2 times or 4 times in an oven kept at 90° C. However, it was broken at a clip portion and did not allow stretching.

From the results of Working Examples 19 to 23 and Comparative Example 9, it can be seen that films having a co-continuous structure with a specific wavelength of concentration fluctuation or a dispersed structure formed by the spinodal decomposition of this invention, and the films obtained by stretching the films have excellent strength and toughness.

TABLE 6

| | | | Working Example 19 | Working Example 20 | Working Example 21 |
|---|---|---|---|---|---|
| Composition | PC-1 | (wt %) | 90 | 70 | 50 |
| | PBT-1 | (wt %) | 10 | 30 | 50 |
| Extruded gut | Polymer alloy structure | | Miscible (transparent) | Miscible (transparent) | Miscible (transparent) |
| Film | Polymer alloy structure | | Dispersed structure (transparent) | Co-continuous structure (transparent) | Co-continuous structure (transparent) |
| | Wavelength of concentration fluctuation or distance between particles | (μm) | 0.003 | 0.003 | 0.003 |
| | Tensile strength | (MPa) | 96 | 95 | 90 |
| | Tensile elongation | (%) | 210 | 290 | 350 |
| Stretched film (lengthwise 2 times × crosswise 2 times) | Polymer alloy structure | | Dispersed structure (transparent) | Co-continuous structure (transparent) | Co-continuous structure (transparent) |
| | Wavelength of concentration fluctuation or distance between particles | (μm) | 0.008 | 0.008 | 0.008 |
| | Mechanical properties | | | | |
| | Tensile strength | (MPa) | 97 | 105 | 97 |
| | Tensile elongation | (%) | 180 | 230 | 250 |
| Stretched film (lengthwise 4 times × crosswise 4 times) | Polymer alloy structure | | Dispersed structure (transparent) | Co-continuous structure (transparent) | Co-continuous structure (transparent) |
| | Wavelength of concentration fluctuation or distance between particles | (μm) | 0.015 | 0.015 | 0.016 |
| | Mechanical properties | | | | |
| | Tensile strength | (MPa) | 100 | 108 | 106 |
| | Tensile elongation | (%) | 150 | 200 | 220 |

| | | | Working Example 22 | Working Example 23 | Comparative Example 9 |
|---|---|---|---|---|---|
| Composition | PC-1 | (wt %) | 30 | 10 | 50 |
| | PBT-1 | (wt %) | 70 | 90 | 50 |
| Extruded gut | Polymer alloy structure | | Miscible (transparent) | Miscible (transparent) | Immiscible (cloudy) |
| Film | Polymer alloy structure | | Co-continuous structure (transparent) | Dispersed structure (transparent) | Dispersed structure (cloudy) |
| | Wavelength of concentration fluctuation or distance between particles | (μm) | 0.003 | 0.003 | — |
| | Tensile strength | (MPa) | 86 | 75 | 58 |
| | Tensile elongation | (%) | 410 | 420 | 45 |

TABLE 6-continued

| Stretched film (lengthwise 2 times × crosswise 2 times) | Polymer alloy structure | | Co-continuous structure (transparent) | Dispersed structure (transparent) | Stretching not allowed |
|---|---|---|---|---|---|
| | Wavelength of concentration fluctuation or distance between particles | (μm) | 0.008 | 0.008 | — |
| | Mechanical properties | | | | |
| | Tensile strength | (MPa) | 91 | 79 | — |
| | Tensile elongation | (%) | 275 | 310 | — |
| Stretched film (lengthwise 4 times × crosswise 4 times) | Polymer alloy structure | | Co-continuous structure (transparent) | Dispersed structure (transparent) | Stretching not allowed |
| | Wavelength of concentration fluctuation or distance between particles | (μm) | 0.016 | 0.015 | — |
| | Mechanical properties | | | | |
| | Tensile strength | (MPa) | 95 | 83 | — |
| | Tensile elongation | (%) | 240 | 250 | — |

WORKING EXAMPLES 24 AND 25

Raw materials with a composition ratio shown in Table 7 were fed into a twin-screw extruder (PCM-30 produced by Ikegai Kogyo) set at an extrusion temperature of 240° C., having two kneading zones and revolved at a high screw rotated speed of 300 rpm. The gut discharged from the die was immediately quickly cooled in icy water, to fix its structure. Both the guts were transparent. The phase structures of the guts were observed with a transmission electron microscope, and it was confirmed that neither of the samples had structure of 0.001 μm or more, and that both the samples were made miscible. From the results, it can be seen that this series was made miscible under the shear flow of an extruder set an extrusion temperature of 240° C.

This series was of a system with an LCST type phase diagram, and had the miscible region expanded under the shear flow of an extruder.

Furthermore, each of the guts was pelletized into pellets using a strand cutter. The pellets were fed into a single-screw extruder (30 mm diameter) set at an extrusion temperature of 250° C. and having a T die at the tip, to produce a film. For producing the film, a casting drum made of hard chromium and having a mirror finished surface with the temperature kept at 20° C. was placed right under (3 cm) the T die. The resin discharged from the mouthpiece of the T die was cast onto the casting drum, and static electricity of 8 kV was applied to bring the film into contact with the casting drum, for quickly cooling it, to fix the structure. Furthermore, the film was passed between rolls set at 5 m/min to keep the take-up speed constant, and taken up using a take-up roll, to obtain a film. The thickness of each of the obtained films was 0.5 mm. The obtained films were transparent. The phase structures of the films were observed with a transmission electron microscope, and it was confirmed that each sample had a co-continuous structure or a dispersed structure. From the obtained films, further samples were cut out for measurement using small-angle X-ray scattering. With each sample, a peak was observed. Table 6 shows the wavelengths of concentration fluctuation (Λm) calculated from the peak positions (θm).

From the above results, it can be considered that when a film is formed, a miscible state is kept even under the shear flow in a single-screw extruder, that after discharge from a T die, the spinodal decomposition under no shear flow causes phase separation, and that the subsequent quick cooling causes the structure to be fixed.

Subsequently, from the films, 85 mm long, 20 mm wide and 0.5 mm thick strip samples were cut out. Each specimen was held at one end portion of 20 mm and fastened to be horizontal like a cantilever. The specimens were placed in an oven of 100, 110, 120, 130, 140, 150 or 160° C. for 60 minutes, and for each specimen, the vertical distance of the tip opposite to the held portion, hanging down by its own weight was measured. The relation between the hanging-down vertical distance at each temperature and the temperature was plotted, and the temperature intersecting with a hanging-down vertical distance of 3 mm was identified as the heat resistance temperature. The value is shown in Table 7.

Comparative Example 10

Melt blending was carried out as described for Working Example 25, except that a single-screw extruder (40 mm diameter) having a full-flighted screw was used at a screw rotated speed of 50 rpm. The gut discharged from the die was immediately quickly cooled in icy water, to obtain a gut with its structure fixed. The gut was cloudy. The phase structure of the gut was observed with a transmission electron microscope, and heterogeneously dispersed structure of 0.5 μm and more were observed. From the result, it can be seen that the sample was of a system not made miscible under the shear flow in the extruder. Also from this sample, a film was produced as described for Working Example 25, and heat resistance was measured. The result is shown in Table 7.

From the results of Working Examples 24 and 25 and Comparative Example 10, it can be seen that films having a co-continuous structure with a specific wavelength of concentration fluctuation or a dispersed structure formed by the spinodal decomposition of this invention have excellent heat resistance.

TABLE 7

|  |  |  | Working Example 24 | Working Example 25 | Comparative Example 10 |
|---|---|---|---|---|---|
| Composition | PC-1 | (wt %) | 90 | 70 | 70 |
|  | AS-1 | (wt %) | 10 | 30 | 30 |
| Extruded gut | Polymer alloy structure | | Miscible (transparent) | Miscible (transparent) | Immiscible (cloudy) |
| Film | Polymer alloy structure | | Dispersed structure (transparent) | Co-continuous structure (transparent) | Dispersed structure (cloudy) |
|  | Wavelength of concentration fluctuation or distance between particles | (µm) | 0.008 | 0.008 | — |
|  | Heat resistance | (° C.) | 147 | 145 | 120 |

As described above, the polymer alloy film of this invention has such properties as excellent strength and toughness or excellent heat resistance, depending on the resins used in combination. The film having excellent strength and toughness can be usefully used as a film especially requiring moldability. Furthermore, the polymer alloy film of this invention has also a property of excellent regularity, and can also be usefully used as a functional film based on it.

In the following Working Examples 26 to 32 and Comparative Examples 11 to 14, the following evaluation methods were used.

(1) Mold Shrinkage Factor

Eighty-millimeter square plates with a thickness of 1 mm (film gates) were produced by molding at a mold temperature of 80° C. in molding cycles consisting of 10 seconds of follow-up pressure application and 10 seconds of cooling. The dimensions of the obtained square plates in the resin flow direction (machine direction) and in the direction perpendicular to the resin flow (transverse direction) were respectively measured, and the shrinkage factors to the dimension of the mold were obtained.

(2) Heat Shrinkage Factor

The 80 mm square plates with a thickness of 1 mm obtained in the above were heat-treated in a hot air oven kept at 60° C. for 2 hours. The dimensions of the heat-treated square plates in the machine direction and in the transverse direction were measured, and the shrinkage factors to the dimensions of the square plates not yet heat-treated were obtained.

(3) Overall Shrinkage Factor

This was calculated as the sum of the mold shrinkage factor and the heat shrinkage factor.

WORKING EXAMPLES 26 TO 32

Raw materials with a composition ratio shown in Table 8 were fed into a twin-screw extruder (PCM-30 produced by Ikegai Kogyo) set at an extrusion temperature of 260° C., with its screws arranged to have two kneading zones and with the screw rotated speed set at 100 rpm as shown in Table 8. The gut discharged from the die was passed through a cooling bath filled with 100 liters of 20° C. water taking 15 seconds, for being quickly cooled to fix the structure. All the guts were transparent, and the phase structures of the guts were observed with a transmission electron microscope. It was confirmed that none of the samples had structure of 0.001 µm or more, and that they were made miscible. From the results, it can be seen that this series could be made miscible in an extruder with an extrusion temperature of 260° C. Furthermore, the glass transition temperatures of 10 mg samples cut out of the guts were measured using DSC, and the results are shown in Table 8.

This series was of a system with an LCST type phase diagram, and had the miscible region expanded under the shear flow of an extruder to allow making miscible.

Furthermore, from the guts, 100 µm thick sections were cut out and respectively heat-treated at 260° C., and the structure-forming processes during the heat treatment were traced using small-angle X-ray scattering and light scattering. With every sample, a peak appeared 0.5 minute after start of heat treatment, and furthermore, when the peak was observed, a tendency of strength increase was observed without any change in the peak position. The stage in which the strength increases without any change in the peak position in the small-angle X-ray scattering and light scattering corresponds to the early stage of spinodal decomposition. The phase structures were observed as described for Working Example 1, and the results are shown in Table 8.

The sections measured using small-angle X-ray scattering and light scattering had structures formed in the early stage, and subsequently continuously heat-treated at the above-mentioned temperature for 2 minutes in total. The wavelengths of concentration fluctuation were measured using small-angle X-ray scattering and light scattering, and the phase structures were observed on transmission electron microscope photographs. The results are shown in Table 8.

Moreover, the guts were pelletized using a pelletizer into pellets to be injection-molded. The obtained pellets were injection-molded using an injection molding machine (PS-60E9DSE) produced by Nissei Plastic Industrial Co., Ltd. set at 240° C., 250° C., 260° C. and 260° C. from the hopper bottom toward the tip, at a mold temperature of 80° C. in molding cycles consisting of 10 seconds of follow-up pressure application and 10 seconds of cooling, to produce 80 mm square plates with a thickness of 1 mm.

From the obtained square plates, 100 µm thick sections were cut out, and as with the samples cut out of the guts, the wavelengths of concentration fluctuation or the distances between particles were obtained using small-angle X-ray scattering and light scattering, and the phase structures were observed on transmission electron microscope photographs. The results are shown in Table 8. From the results, it can be seen that even injection molding allowed the formation of structures similar to those formed when the samples cut out of the guts were heat-treated.

As the flowability indicating injection moldability, the lowest injection pressure for filling the aforesaid 80 mm square mold with a thickness of 1 mm with the resin composition up to its tip was obtained, and it is shown in Table 8 as the lowest molding pressure. Furthermore, the specific gravity of each injection-molded article was obtained by an underwater replacement method using the aforesaid square plate.

As can be seen from the comparison between Working Examples 28 and 29, if the shear flow during melt blending is intensified, a finer structure can be formed, and a molded article with more excellent injection moldability and dimensional stability can be obtained.

TABLE 8

|  |  |  | Working Example 26 | Working Example 27 | Working Example 28 | Working Example 29 |
|---|---|---|---|---|---|---|
| Composition | PBT-2 | parts by weight | 100 | 100 | 100 | 100 |
|  | PC-2 | parts by weight | 11 | 25 | 43 | 43 |
|  | PC-3 | parts by weight |  |  |  |  |
|  | E-1 | parts by weight | 0.1 | 0.1 | 0.1 | 0.1 |
|  | Releasing agent | parts by weight | 0.4 | 0.4 | 0.4 | 0.4 |
| Extrusion condition | Screw speed | (rpm) | 300 Melt blending under strong shear | 300 Melt blending under strong shear | 300 Melt blending under strong shear | 100 Ordinary melt blending |
| Extruded gut | Miscibility |  | Miscible | Miscible | Miscible | Miscible |
|  | Glass transition temperature | (° C.) | 49 (single) | 58 (single) | 69 (single) | 69 (single) |
| Extruded gut (heat-treated) | Heat treatment conditions |  | 260° C. × 0.5 min | 260° C. × 0.5 min | 260° C. × 0.5 min | 260° C. × 0.5 min |
|  | Initial structure |  | Co-continuous structure | Co-continuous structure | Co-continuous structure | Co-continuous structure |
|  | Wavelength of concentration fluctuation | (μm) | 0.01 | 0.02 | 0.02 | 0.08 |
|  | Heat treatment conditions |  | 260° C. × 2 min | 260° C. × 2 min | 260° C. × 2 min | 260° C. × 2 min |
|  | Polymer alloy structure |  | Dispersed structure | Co-continuous structure | Co-continuous structure | Co-continuous structure |
|  | Wavelength of concentration fluctuation or distance between particles | (μm) | 0.13 | 0.08 | 0.06 | 0.12 |
|  | Structural mode |  | Spinodal decomposition | Spinodal decomposition | Spinodal decomposition | Spinodal decomposition |
| Injection-molded article | Polymer alloy structure |  | Dispersed structure | Co-continuous structure | Co-continuous structure | Co-continuous structure |
|  | Wavelength of concentration fluctuation or distance between particles | (μm) | 0.15 | 0.09 | 0.06 | 0.13 |
|  | Specific gravity |  | 1.29 | 1.28 | 1.26 | 1.26 |
| Flow ability | Lowest molding pressure (square plate) | (MPa) | 32 | 35 | 39 | 45 |
| Mold shrinkage factor | Machine direction (1 mm thick) | (%) | 0.95 | 0.71 | 0.58 | 0.89 |
|  | Traverse direction (1 mm thick) | (%) | 0.98 | 0.88 | 0.77 | 0.91 |
| Heat shrinkage factor (60° C. × 2 hours) | Machine direction (1 mm thick) | (%) | 0.08 | 0.07 | 0.06 | 0.08 |
|  | Traverse direction (1 mm thick) | (%) | 0.08 | 0.07 | 0.05 | 0.07 |
| Overall shrinkage factor (60° C. × 2 hours) | Machine direction (1 mm thick) | (%) | 1.03 | 0.78 | 0.64 | 0.97 |
|  | Traverse direction (1 mm thick) | (%) | 1.06 | 0.95 | 0.82 | 0.98 |

TABLE 8-continued

| | | | Working Example 30 | Working Example 31 | Working Example 32 |
|---|---|---|---|---|---|
| Composition | PBT-2 | (wt %) | 100 | 100 | 100 |
| | PC-2 | (wt %) | | 90 | 110 |
| | PC-3 | (wt %) | 43 | | |
| | E-1 | (wt %) | 0.1 | 0.1 | 0.1 |
| | Releasing agent | (wt %) | 0.4 | 0.4 | 0.4 |
| Extrusion condition | Screw speed | (rpm) | 300 Melt blending under strong shear | 300 Melt blending under strong shear | 300 Melt blending under strong shear |
| Extruded gut | Miscibility | | Miscible | Miscible | Miscible |
| | Glass transition temperature | (° C.) | 67 (single) | 92 (single) | 102 (single) |
| Extruded gut (heat-treated) | Heat treatment conditions | | 260° C. × 0.5 min | 260° C. × 0.5 min | 260° C. × 0.5 min |
| | Initial structure | | Co-continuous structure | Co-continuous structure | Co-continuous structure |
| | Wavelength of concentration fluctuation | (μm) | 0.02 | 0.01 | 0.02 |
| | Heat treatment conditions | | 260° C. × 2 min | 260° C. × 2 min | 260° C. × 2 min |
| | Polymer alloy structure | | Dispersed structure | Co-continuous structure | Co-continuous structure |
| | Wavelength of concentration fluctuation or distance between particles | (μm) | 0.04 | 0.05 | 0.06 |
| | Structural mode | | Spinodal decomposition | Spinodal decomposition | Spinodal decomposition |
| Injection-molded article | Polymer alloy structure | | Dispersed structure | Dispersed structure | Co-continuous structure |
| | Wavelength of concentration fluctuation or distance between particles | (μm) | 0.05 | 0.05 | 0.06 |
| | Specific gravity | | 1.26 | 1.25 | 1.25 |
| Flow ability | Lowest molding pressure (square plate) | (MPa) | 48 | 59 | 75 |
| Mold shrinkage factor | Machine direction (1 mm thick) | (%) | 0.58 | 0.43 | 0.37 |
| | Traverse direction (1 mm thick) | (%) | 0.72 | 0.56 | 0.41 |
| Heat shrinkage factor (60° C. × 2 hours) | Machine direction (1 mm thick) | (%) | 0.06 | 0.02 | 0.02 |
| | Traverse direction (1 mm thick) | (%) | 0.05 | 0.02 | 0.02 |
| Overall shrinkage factor (60° C. × 2 hours) | Machine direction (1 mm thick) | (%) | 0.64 | 0.45 | 0.39 |
| | Traverse direction (1 mm thick) | (%) | 0.82 | 0.58 | 0.43 |

Comparative Example 11

Raw materials were melt blended and pelletized, and the pellets were injection-molded as described for Working Example 26, except that PBT only was used-as a resin. Also for this sample, injection moldability and dimensional stability were measured as described for Working Example 26. As a result, only a molded article with poor dimensional stability could be obtained, even though it was excellent in injection moldability. The results are shown in Table 9.

Comparative Example 12

Melt blending, pelletization and injection molding were carried out as described for Working Example 28, except that a single-screw extruder (Tanabe VS40-32) set at a screw rotated speed of 100 rpm was used for melt blending. Also for this sample, injection moldability and dimensional stability were measured as described for Working Example 26, and only a molded article with poor dimensional stability could be obtained. The results are shown in Table 9.

Comparative Example 13

Melt blending, pelletization and injection molding were carried out as described for Working Example 26, except that 27 parts by weight of PC and 6.7 parts by weight of styrene-containing acrylic graft copolymer were mixed with 100 parts by weight of PBT and that the screw rotated speed was set at 100 rpm as set for general melt blending. The extruded gut was also observed as described for Working Example 1, and a structure separated into two phases was observed. Furthermore, when the glass transition temperature of a 10 mg sample cut out of the gut was measured using DSC, two glass transition temperatures attributable to the two phases were measured contrary to the fact that a single glass transition temperature was measured as a feature of the miscible systems obtained in Working Examples 26 to 32. From the results, it can be seen that this system was immiscible during melt blending. Next, the structure of the extruded gut during heat treatment was observed as described for Working Example 26, and as a result, in light scattering, no peak appeared. Furthermore, the transmission electron microscope photograph showed a structure in which two separated phases are dispersed like an irregular network. Also for this sample, injection moldability and dimensional stability were measured as described for Working Example 26, and as a result, only a molded article with poor dimensional stability could be obtained, though it had excellent injection moldability. The results are shown in Table 9.

Comparative Example 14

Melt blending, pelletization and injection molding were carried out as described for Working Example 26, except that PC only was used as a resin. Also for this sample, injection moldability and dimensional stability were measured as described for Working Example 26, and as a result, only a molded article very low in the flowability indicating injection moldability could be obtained, though it had excellent dimensional stability.

The results are shown in Table 9.

TABLE 9

| | | | Comparative Example 11 | Comparative Example 12 | Comparative Example 13 | Comparative Example 14 |
|---|---|---|---|---|---|---|
| Composition | PBT-2 | parts by weight | 100 | 100 | 100 | |
| | PC-2 | parts by weight | | 43 | 27 | 100 |
| | E-1 | parts by weight | | 0.1 | | |
| | X-1 | parts by weight | | | 6.7 | |
| | Releasing agent | parts by weight | 0.4 | 0.4 | 0.4 | 0.4 |
| Extrusion condition | Screw speed | (rpm) | 300 Melt blending under strong shear | 100 Single-screw melt-blending | 100 Ordinary melt blending | 300 Melt blending under strong shear |
| Extruded gut | Miscibility | | — | Immiscible | Immiscible | — |
| | Glass transition temperature | (° C.) | 32 | 33, 150 | 33, 150 | 151 |
| Extruded gut (heat-treated) | Heat treatment conditions | | — | 260° C. × 0.5 min | 260° C. × 0.5 min | — |
| | Initial structure | | — | Dispersed structure | Network structure | — |
| | Wavelength of concentration fluctuation | (µm) | — | 1.8 | Without co-continuous structure | — |
| | Heat treatment conditions | | — | 260° C. × 2 min | 260° C. × 2 min | — |
| | Polymer alloy structure | | — | Dispersed structure | Network structure | — |
| | Wavelength of concentration fluctuation or distance between particles | (µm) | — | 1.8 | Without co-continuous structure | — |
| | Structural mode | | — | Irregularly dispersed | Irregular network | — |
| Injection-molded article | Polymer alloy structure | | — | Dispersed structure | Network structure | — |
| | Wavelength of concentration fluctuation or distance between particles | (µm) | — | 1.8 | Without co-continuous structure | — |
| | Specific gravity | | 1.31 | 1.26 | 1.27 | 1.20 |
| Flowability | Lowest molding pressure (square plate) | (MPa) | 35 | 42 | 52 | 87 |
| Mold shrinkage factor | Machine direction (1 mm thick) | (%) | 1.39 | 1.21 | 1.15 | 0.49 |
| | Traverse direction (1 mm thick) | (%) | 1.45 | 1.23 | 1.28 | 0.53 |
| Heat shrinkage factor (60° C. × 2 hours) | Machine direction (1 mm thick) | (%) | 0.17 | 0.14 | 0.13 | 0.01 |
| | Traverse direction (1 mm thick) | (%) | 0.18 | 0.15 | 0.14 | 0.02 |
| Overall shrinkage factor (60° C. × 2 hours) | Machine direction (1 mm thick) | (%) | 1.56 | 1.35 | 1.28 | 0.50 |
| | Traverse direction (1 mm thick) | (%) | 1.63 | 1.38 | 1.42 | 0.55 |

From the results of Working Examples 26 to 32 and Comparative Examples 11 to 14, it can be seen that samples structurally controlled to have a co-continuous structure with a wavelength of concentration of fluctuation of 0.01 to 1 μm or a dispersed structure with a distance between particles of 0.01 to 1 μm by melt blending the polymer alloys of this invention are decreased in the mold shrinkage factors at the time of injection molding and in the heat shrinkage factors after heat treatment and also excellent in moldability.

WORKING EXAMPLES 33 TO 41

Raw materials with a composition ratio shown in Table 10 were fed into a parallel plates type shear flow-applying device (CSS-430 produced by Linekam), and molten at a kneading temperature of 320° C. Then, a shear field was applied at the shear rate shown in Table 10. Every sample was observed in the portion subjected to the shear field at the shear rate shown in Table 10, and it was confirmed that none of the samples have any structure. Each sample was immediately quickly cooled in icy water to obtain a sample its structure fixed. The phase structure of the obtained sample was observed with a transmission electron microscope. It was confirmed that none of the samples had structure of 0.001 μm or more, and that they were made miscible. So, it was found that this series could be made miscible at 320° C. under the shearing condition shown in Table 10.

Next, raw materials with a composition ratio shown in Table 10 were fed into a twin-screw extruder (PCM-30 produced by Ikegai Kogyo) set at an extrusion temperature of 320° C., having two kneading zones and revolved at a high screw rotated speed of 300 rpm, and the gut discharged from the die was immediately quickly cooled in icy water, to fix the structure. All the guts were transparent. The phase structures of the guts were observed with a transmission electron microscope, and it was confirmed that none of the samples had structure of 0.001 μm or more, and that they were made miscible. So, it can be seen that this series could be made miscible under the shear flow in an extruder set at an extrusion temperature of 320° C.

Then, each of the guts was heat-treated using a hot press at the temperature shown in Table 10 and for the time period shown in Table 10, and quickly cooled to produce a sheet (0.2 mm thick) with its structure fixed. From the sheet, a 100 μm thick section was cut out, and was measured using small-angle X-ray scattering or light scattering. Table 10 shows the wavelengths of concentration fluctuation ($\Lambda m$) calculated from the peak position ($\theta m$).

From the above, it can be considered that a sample made miscible under the shear flow of a twin-screw extruder was separated into phases owing to the spinodal decomposition when it was formed into a sheet using a hot press, and that when it was subsequently quickly cooled, the structure was fixed.

Subsequently from each of the sheets, a 50 mm long, 10 mm wide and 0.2 mm thick sample was cut out. The tensile strength was measured at an inter-chuck distance of 20 mm and a tensile speed of 10 mm/min, and after it was allowed to stand in a hot air oven kept at 180° C. for 30 minutes, its heat shrinkage factor (%) in reference to the initial length was measured. The results are shown in Table 10.

Comparative Example 15

The tensile strength and heat shrinkage factor of a sample were measured as described for Working Example 35, except that the heat treatment was carried out at 320° C. for 3 minutes, and the phase structure was observed. The results are shown in Table 10.

When the heat treatment temperature was high as in this example causing the structure to be coarsened, hence causing the wavelength of concentration fluctuation to exceed the scope of the present invention, then only a sample poor in mechanical properties and heat resistance could be obtained.

Comparative Example 16

Raw materials were melt blended as described for Working Example 35, except that polybutylene terephthalate resin was used as an alloy component in addition to PPS resin, and a gut was discharged from the die and quickly cooled in icy water, to obtain a gut with its structure fixed. This sample was cloudy. The phase structure of the gut was observed with a transmission electron microscope. Heterogeneously dispersed structure of 2.0 μm and more were observed. From the result, it can be seen that the sample was made miscible under the shear flow in an extruder with an extrusion temperature of 320° C. Also for this sample, the tensile strength and heat shrinkage factor were measured as described for Working Example 35, and the structure was observed. The results are shown in Table 10.

TABLE 10

| | | | Working Example 33 | Working Example 34 | Working Example 35 | Working Example 36 |
|---|---|---|---|---|---|---|
| Composition | PPS-1 | (wt %) | 90 | 80 | 70 | 70 |
| | PET-1 | (wt %) | 10 | 20 | 30 | 30 |
| | PBT-3 | (wt %) | | | | |
| Kneading conditions | Shear rate | (sec$^{-1}$) | 1000 | 1000 | 1000 | 1000 |
| | Miscibility | | Miscible | Miscible | Miscible | Miscible |
| Extruded gut | Polymer alloy structure | | Miscible (transparent) | Miscible (transparent) | Miscible (transparent) | Miscible (transparent) |
| Sheet (heat-treated) | Heat treatment conditions | | 290° C. × 1 min | 290° C. × 1 min | 290° C. × 1 min | 290° C. × 2 min |
| | Polymer alloy structure | | Dispersed structure | Co-continuous structure | Co-continuous structure | Co-continuous structure |
| | Wavelength of concentration fluctuation or distance between particles | (μm) | 0.03 | 0.3 | 0.7 | 1.1 |
| | Tensile strength | (MPa) | 88 | 82 | 78 | 73 |
| | Heat shrinkage factor | (%) | 0.1 | 0.3 | 0.4 | 0.7 |

TABLE 10-continued

|  |  |  | Working Example 37 | Working Example 38 | Working Example 39 | Working Example 40 |
|---|---|---|---|---|---|---|
| Composition | PPS-1 | (wt %) | 70 | 60 | 50 | 30 |
|  | PET-1 | (wt %) | 30 | 40 | 50 | 70 |
|  | PBT-3 | (wt %) |  |  |  |  |
| Kneading conditions | Shear rate | (sec$^{-1}$) | 1000 | 1000 | 1000 | 1000 |
|  | Miscibility |  | Miscible | Miscible | Miscible | Miscible |
| Extruded gut | Polymer alloy structure |  | Miscible (transparent) | Miscible (transparent) | Miscible (transparent) | Miscible (transparent) |
| Sheet (heat-treated) | Heat treatment conditions |  | 290° C. × 3 min | 290° C. × 1 min | 290° C. × 1 min | 290° C. × 1 min |
|  | Polymer alloy structure |  | Co-continuous structure | Co-continuous structure | Co-continuous structure | Co-continuous structure |
|  | Wavelength of concentration fluctuation or distance between particles | (μm) | 1.5 | 1.1 | 1.0 | 0.8 |
|  | Tensile strength | (MPa) | 64 | 70 | 68 | 65 |
|  | Heat shrinkage factor | (%) | 1.2 | 0.7 | 0.9 | 1.1 |

|  |  |  | Working Example 41 | Comparative Example 15 | Comparative Example 16 |
|---|---|---|---|---|---|
| Composition | PPS-1 | (wt %) | 10 | 70 | 70 |
|  | PET-1 | (wt %) | 90 | 30 |  |
|  | PBT-3 | (wt %) |  |  | 30 |
| Kneading conditions | Shear rate | (sec$^{-1}$) | 1000 | — | — |
|  | Miscibility |  | Miscible | — | — |
| Extruded gut | Polymer alloy structure |  | Miscible (transparent) | Miscible (transparent) | Immiscible (cloudy) |
| Sheet (heat-treated) | Heat treatment conditions |  | 290° C. × 1 min | 320° C. × 3 min | 290° C. × 1 min |
|  | Polymer alloy structure |  | Dispersed structure | Dispersed structure | Dispersed structure |
|  | Wavelength of concentration fluctuation or distance between particles | (μm) | 0.03 | 2.2 | — |
|  | Tensile strength | (MPa) | 63 | 54 | 43 |
|  | Heat shrinkage factor | (%) | 1.5 | 3.0 | 5.1 |

From the results of Working Examples 33 and 41 and Comparative Examples 15 and 16, it can be seen that the co-continuous structure with a specific wavelength of concentration fluctuation or dispersed structure, respectively consisting of PPS resin and PET resin, of this invention have excellent mechanical properties and heat resistance.

The polymer alloy of this invention, containing polyphenylene sulfide resin and a polyester resin with polyethylene terephthalate as a main component and having a specific structure, can be a polymer alloy having the excellent properties of the polyphenylene sulfide resin.

The manufacturing method as the first version of this invention can provide a polymer alloy having excellent regularity and having a homogeneously dispersed fine structure. The obtained polymer alloy is excellent in such properties as strength, toughness and heat resistance, depending on the resins used in combination, and can be usefully used as a structural material based on these properties. Furthermore, the polymer alloy obtained according to this invention can also be usefully used as a function material based on its excellent regularity.

The polymer alloy pellets as the second or third version of this invention can be used to produce a molded article, film, fibers or the like with excellent mechanical properties at high productivity. Especially the polymer alloy, polymer alloy film or sheet, molded polymer alloy article and the like as the fourth to seventh versions of this invention can be suitably produced.

The polymer alloy film or sheet as the fourth version of this invention has excellent properties such as strength, toughness and heat resistance, depending on the resins used in combination, and can be especially usefully used as a film requiring moldability. Moreover, the polymer alloy film or sheet of this invention has also a property of excellent regularity, and can also be usefully used as a functional film or sheet based on the regularity.

Furthermore, the polymer alloy film obtained according to this invention can be used in various methods, generally depending on the feature of its components. Above all, it can be suitably used as a moldable film enhanced in toughness by using a resin with excellent mechanical properties as one of the resins, or as a heat-resistant film enhanced in heat resistance by using a resin with excellent heat resistance as one of the resins, or as a functional film in which a functional component loaded with a magnetic substance, a catalyst or the like is finely dispersed in one of the resins. Moreover, the polymer alloy film can also be suitably used as a transparent film based on the structural control of this invention capable of achieving a wavelength shorter than that of visible light.

The moldable film can be, for example, suitably used as an in-mold film, transfer foil or a film for various packages, etc.

The molded polymer alloy article as the fifth version of this invention and the polymer alloy as the sixth version are, in view of properties, decreased in the mold shrinkage factor during molding and in the heat shrinkage factor after heat treatment, excellent also in moldability, and low in specific gravity. Based on these properties, they can be usefully used for such applications as electric and electronic apparatus parts, automobile parts, and mechanical system parts.

The polymer alloy as the seventh version of this invention has excellent heat resistance and chemicals resistance of polyphenylene sulfide and is also economically excellent. So, it can be suitably used for various film applications and also for such applications as bag filter, motor-binding string, motor-binding tape, dryer canvas for papermaking, net conveyor for thermal bond method or thermal bond process of nonwoven fabric, carrier belt in a drying machine or heat treatment machine, filter, etc. Especially in the case where it is processed into fibers, fibers with excellent properties can be obtained.

The invention claimed is:

1. A polymer alloy, comprising polyphenylene sulfide resin and a polyester resin with polyethylene terephthalate as a main component, and forming a co-continuous structure with a wavelength of concentration fluctuation of 0.001 to 1 μm or a dispersed structure with a distance between particles of 0.001 to 1 μm.

2. A polymer alloy, according to claim 1, wherein said co-continuous structure or dispersed structure is formed by the phase separation caused by the spinodal decomposition.

3. A polymer alloy, according to claim 2, wherein said polymer alloy is miscible when the shear rate is kept in a range from 100 to 10000 $\sec^{-1}$, and is separated into phases under no shear flow.

* * * * *